(12) United States Patent
Ota et al.

(10) Patent No.: US 11,016,406 B2
(45) Date of Patent: May 25, 2021

(54) IMAGE FORMING APPARATUS

(71) Applicants: Masashi Ota, Kanagawa (JP); Masatoshi Ishida, Kanagawa (JP); Yohei Osanai, Kanagawa (JP); Satoshi Narai, Kanagawa (JP); Takayuki Andoh, Kanagawa (JP); Tomoya Fujii, Kanagawa (JP); Kunihiko Nishioka, Kanagawa (JP); Munekazu Hirata, Tokyo (JP)

(72) Inventors: Masashi Ota, Kanagawa (JP); Masatoshi Ishida, Kanagawa (JP); Yohei Osanai, Kanagawa (JP); Satoshi Narai, Kanagawa (JP); Takayuki Andoh, Kanagawa (JP); Tomoya Fujii, Kanagawa (JP); Kunihiko Nishioka, Kanagawa (JP); Munekazu Hirata, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 98 days.

(21) Appl. No.: 16/544,277

(22) Filed: Aug. 19, 2019

(65) Prior Publication Data
US 2020/0096897 A1  Mar. 26, 2020

(30) Foreign Application Priority Data
Sep. 26, 2018  (JP) .............................. JP2018-180972

(51) Int. Cl.
*G03G 15/04* (2006.01)
*G02B 26/10* (2006.01)
*G03G 15/00* (2006.01)

(52) U.S. Cl.
CPC ......... *G03G 15/0409* (2013.01); *G02B 26/10* (2013.01); *G03G 15/6552* (2013.01)

(58) Field of Classification Search
CPC . G03G 15/0409; G03G 15/6552; G02B 26/10
See application file for complete search history.

(56) References Cited

U.S. PATENT DOCUMENTS

| 2009/0162082 A1 | 6/2009 | Shiraki et al. |
| 2012/0062685 A1 | 3/2012 | Serizawa et al. |

(Continued)

FOREIGN PATENT DOCUMENTS

JP  2004-216662  8/2004

OTHER PUBLICATIONS

U.S. Appl. No. 16/215,990, filed Dec. 11, 2018, Toshikane Nishii, et al.

(Continued)

*Primary Examiner* — Lamson D Nguyen
(74) *Attorney, Agent, or Firm* — Harness, Dickey & Pierce, P.L.C.

(57) ABSTRACT

An image forming apparatuses includes an apparatus body configured to house a replacement part. The apparatus body includes a guiding face configured to guide a guided face of the replacement part. The guided face is on a side along a movement direction in which the replacement part moves between a set position in the apparatus body and an attaching and detaching position at which the replacement part is attached to and detached from the apparatus body. The apparatus further include a moving device configured to move the replacement part between the set position and the attaching and detaching position, and a pressing device configured to press the guided face of the replacement part against the guiding face of the apparatus body while the replacement part moves between the set position and the attaching and detaching position.

11 Claims, 19 Drawing Sheets

(56) References Cited

U.S. PATENT DOCUMENTS

| | | |
|---|---|---|
| 2012/0300007 A1 | 11/2012 | Fujii et al. |
| 2013/0188004 A1 | 7/2013 | Arai et al. |
| 2013/0194370 A1 | 8/2013 | Sakaue et al. |
| 2014/0140726 A1* | 5/2014 | Fukao ............... G03G 15/1615 399/121 |
| 2014/0369046 A1 | 12/2014 | Andoh |
| 2015/0147099 A1* | 5/2015 | Tosaka ............... G03G 15/5058 399/301 |
| 2016/0352955 A1 | 12/2016 | Ishida et al. |
| 2018/0361761 A1 | 12/2018 | Okeguchi et al. |

OTHER PUBLICATIONS

U.S. Appl. No. 16/233,522, filed Dec. 27, 2018, Toshikane Nishii, et al.
U.S. Appl. No. 16/243,423, filed Jan. 9, 2019, Toshikane Nishii, et al.
U.S. Appl. No. 16/451,424, filed Jun. 25, 2019, Masashi Ota, et al.
U.S. Appl. No. 16/436,154, filed Jun. 10, 2019, Tomoya Fujii, et al.
U.S. Appl. No. 16/459,904, filed Jul. 2, 2019, Munekazu Hirata, et al.
U.S. Appl. No. 16/521,896, filed Jul. 25, 2019, Yohei Osanai, et al.

\* cited by examiner

IMAGE FORMING APPARATUS

CROSS-REFERENCE TO RELATED APPLICATIONS

This patent application is based on and claims priority pursuant to 35 U.S.C. § 119(a) to Japanese Patent Application No. 2018-180972, filed on Sep. 26, 2018, in the Japan Patent Office, the entire disclosure of which is incorporated by reference herein.

BACKGROUND

Technical Field

The present invention relates to an image forming apparatus.

Discussion of the Related Art

Conventionally, there are image forming apparatuses including a moving mechanism to move a replacement part between a set position of the replacement part in a printer body and an attaching and detaching position at which the replacement part is attached to and detached from the printer body.

SUMMARY

According to an embodiment of this disclosure, an image forming apparatuses includes an apparatus body configured to house a replacement part. The apparatus body includes a guiding face configured to guide a guided face of the replacement part. The guided face is on a side along a movement direction in which the replacement part moves between a set position in the apparatus body and an attaching and detaching position at which the replacement part is attached to and detached from the apparatus body. The apparatus further include a moving device configured to move the replacement part between the set position and the attaching and detaching position, and a pressing device configured to press the guided face of the replacement part against the guiding face of the apparatus body while the replacement part moves between the set position and the attaching and detaching position.

BRIEF DESCRIPTION OF THE DRAWINGS

The aforementioned and other aspects, features, and advantages of the present disclosure would be better understood by reference to the following detailed description when considered in connection with the accompanying drawings, wherein.

Figure 1:
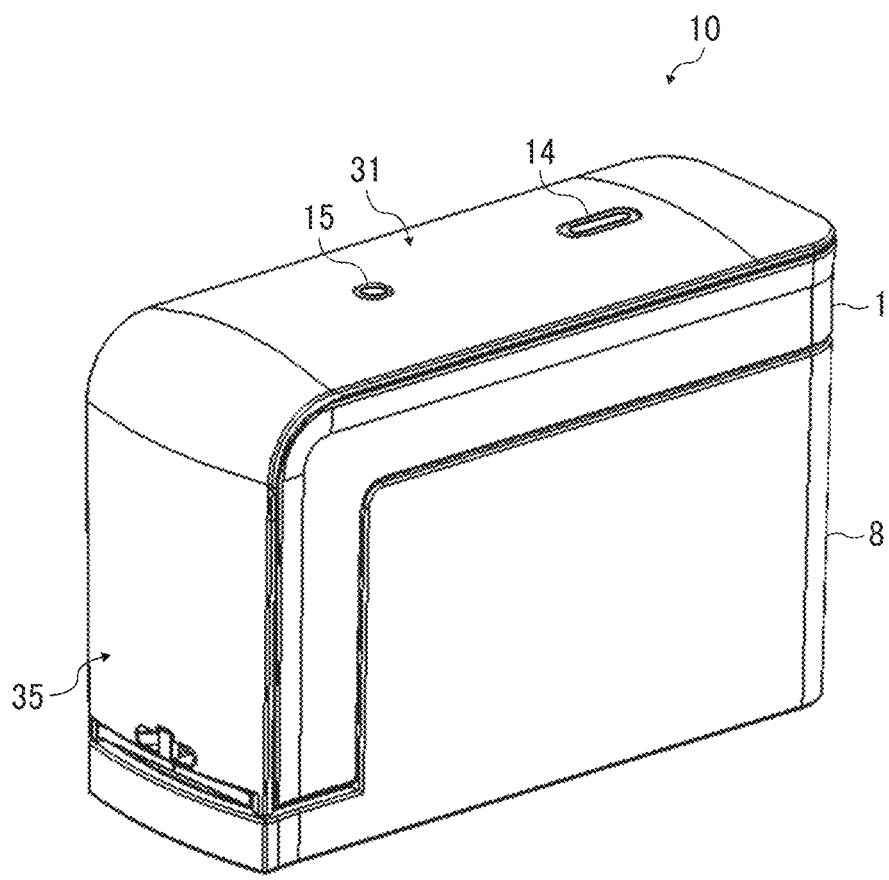
FIG. 1 is an exterior perspective view of a handheld printer according to an embodiment, viewed from obliquely above.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Referring now to the drawings, embodiments of the present disclosure are described below. In the drawings for explaining the following embodiments, the same reference codes are allocated to elements (members or components) having the same function or shape and redundant descriptions thereof are omitted below.

Descriptions are given below of a handheld mobile inkjet printer (hereinafter simply referred to as "handheld printer") that is an image forming apparatus, according to an embodiment of the present disclosure.

First, a basic configuration of a printer body of the handheld printer according to the present embodiment is described.

FIG. 1 is a perspective view illustrating an exterior of a handheld printer 10 according to the present embodiment, as viewed from obliquely above.

Figure 2:
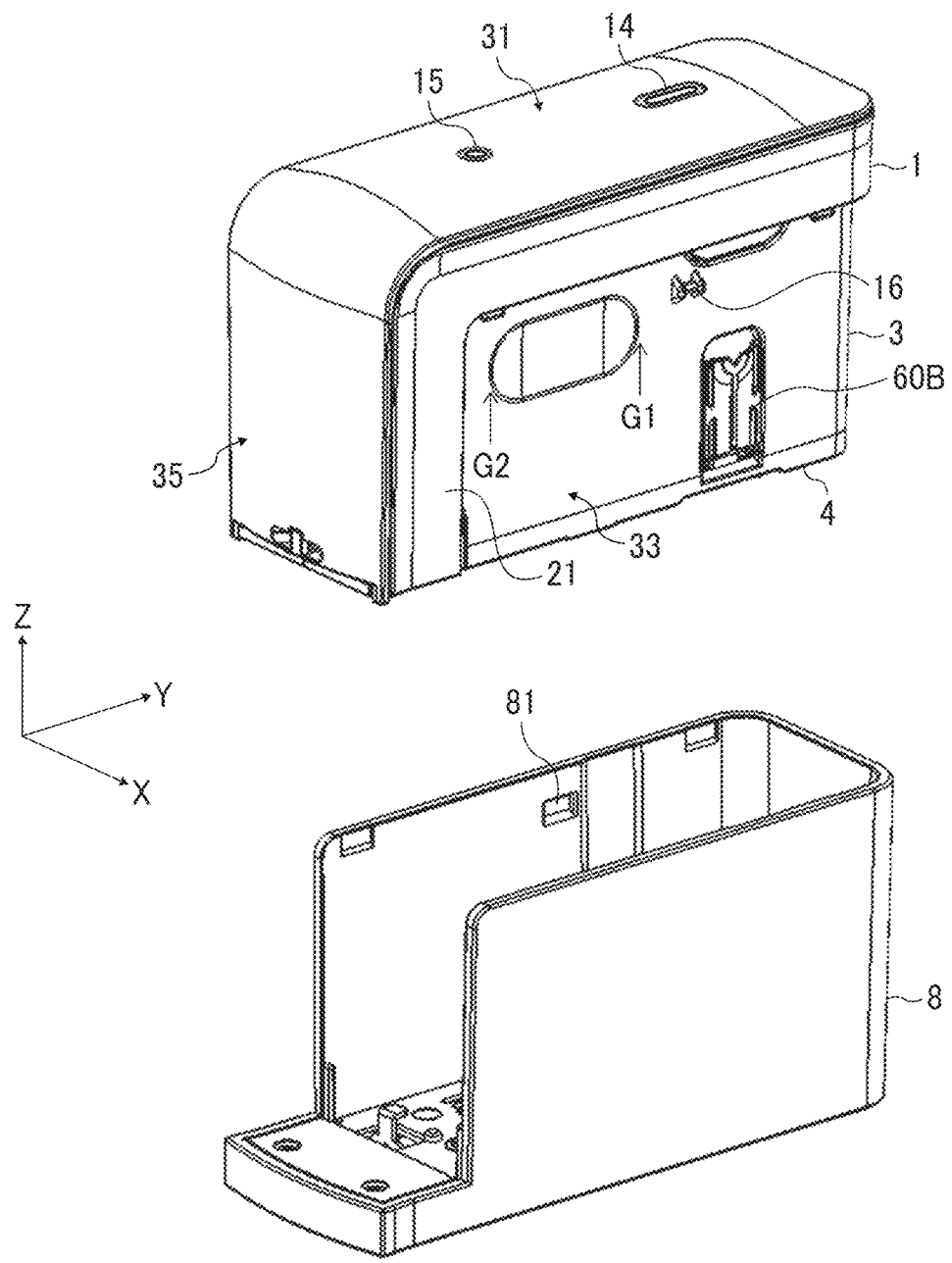
FIG. 2 is an exterior perspective view illustrating a state where a cover is removed from a printer body.

FIG. 2 is an exterior perspective view of the printer body 1 in which a cover 8 is removed from the printer body 1. The printer body 1 is an apparatus body of the handheld printer 10.

The handheld printer 10, according to the present embodiment, includes the printer body 1, a spacer 4 removably attached to the printer body 1, and the cover 8, which is attached to the printer body 1 with the spacer 4 housed in the cover 8. The cover 8 is made of resin such as acrylonitrile butadiene styrene (ABS) resin, and recesses 81 are formed on the inner wall surface thereof. When the cover 8 is attached to the printer body 1, two projections 16 (one of the two is illustrated in FIG. 2) provided on the printer body 1 are respectively hooked to two recesses 81 (one of the two is illustrated in FIG. 2) provided on the cover 8 by snap-fit. Thereby, the state in which the cover 8 is attached to the printer body 1 is held. When removing the cover 8 from the printer body 1, the user pulls the printer body 1 out of the cover 8 so that the projections 16 caught by the snap-fit are removed from the recesses 81 and the user can remove the cover 8 from the printer body 1.

Figure 3:
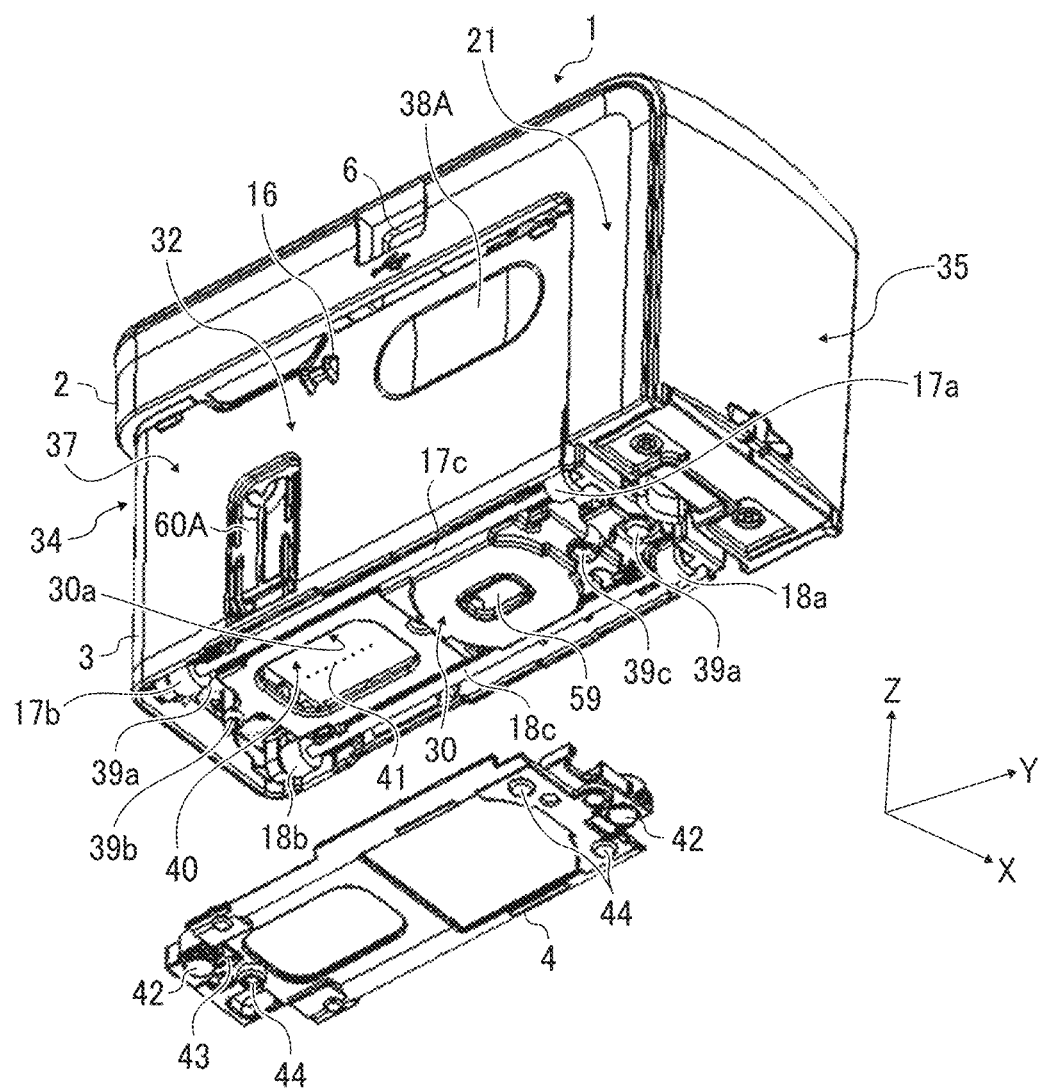
FIG. 3 is an exterior perspective view of the printer body in a state where a spacer member is separated, viewed from obliquely below.

FIG. 3 is an exterior perspective view of the printer body 1 and the spacer 4 removed from the printer body 1, as viewed obliquely from below.

The printer body 1 illustrated in FIG. 3 includes an upper unit 2 and a lower unit 3. The printer body 1 as a whole is shaped like a rectangular parallelepiped. In a scanning direction, that is, a printing direction indicated by arrow X in FIG. 1 (X-axis direction), the printer body 1 has such a length that a user can grasp the printer body 1 with a palm.

The housing of the printer body 1 includes a recording faces 30, an upper face 31 opposite the recording face 30, a left face 32 extending in the direction indicated by arrow Y, orthogonal to the scanning direction (indicated by arrow X in the drawings) on the recording face 30. On the recording face 30, a recording device (an image forming device) of an ink cartridge described later faces a recording medium. The housing further includes, for example, a right face 33 extending in the direction orthogonal to the scanning direction (indicated by arrow X), a rear face 34 extending in the scanning direction, and a front face 35 extending in the scanning direction. The printer body 1 is usually used in such a posture that the recording face 30 is faced vertically down and the upper face 31, which is opposite the recording face 30, is faced vertical up.

A print button 14 as an image formation operation device and a power button 15 as a power supply operation device are disposed on the upper face 31. The left face 32 of the upper unit 2 includes a universal serial bus (USB) connection port 6. The USB connection port 6 is a port for connecting a USB cable. The printer body 1 is provided with a rechargeable battery mounted therein. The rechargeable battery can be charged when electric power is supplied thereto from an external power supply via the USB cable connected to the USB connection port 6.

On the front face 35 side of the lower unit 3, a wide portion 21 of the upper unit 2 wider than a narrow portion 37 of the lower unit 3 is positioned. The left and right faces 32 and 33 of the narrow portion 37 of the lower unit 3 include finger-grip portions 38A and 38B as finger rest portions to which the user applies his or her fingers. The finger-grip portions 38A and 38B are formed at the positions where the user applies the fingers (usually the thumb and one of the middle finger, the ring finger, and the little finger) of the hand, respectively, when the user holds and uses the printer body 1. To move the printer body 1 on a surface of the recording medium in the scanning direction (X-axis direction) for image formation, the user holds the printer body 1 as follows. The user positions the wide portion 21 closer to the wrist side and sandwiches the lower unit 3 with the fingers applied to the finger-grip portions 38A and 38B on the left and right faces 32 and 33, respectively.

In the present embodiment, the finger-grip portions 38A and 38b are shallow recesses or grooves having such a depth that a flat portion of a finger is caught therein, so that the finger is slightly caught thereby when the user grips the finger-grip portions 38A and 38B. The form of the finger rest portion is not limited to the recess or the groove as described above, and may be, for example, a projection or a protrusion. Moreover, as long as the user can recognize the positions where to apply fingers, the distinguishing of the finger rest portions is not limited to the shape. For example, the finger rest portion can be recognized with, instead of or in addition to the shape, an illustration such as a frame line colored differently from the remaining area of the side faces (the left and right faces 32 and 33).

The wide portion 21 is made wider than the narrow portion 37 in the scanning orthogonal direction so that the outer wall surface of the wide portion 21 and the outer wall surface of the cover 8 are on a substantially identical plane when the cover 8 is attached to the printer body 1, as illustrated in FIG. 1.

Figure 4:
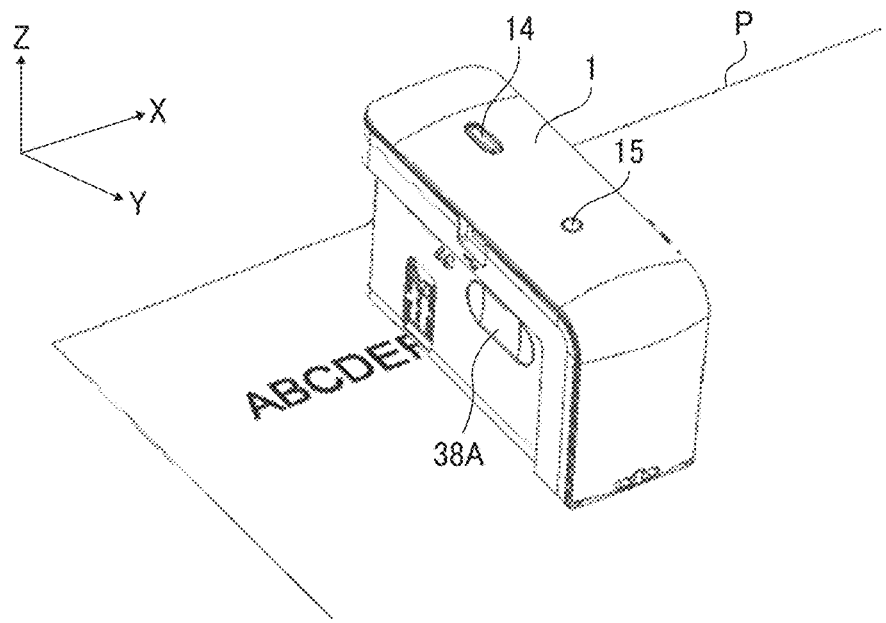
FIG. 4 is an explanatory diagram illustrating an aspect where an image is formed on a recording material at the printer body.

The user can switch on and off the power of the printer body 1 by holding down the power button 15. As described above, a structure that power is turned off by pressing the power button 15 for a while can suppress the erroneous operation of the power button 15 during the image forming operation. When the power is turned on, a control board provided in the upper unit 2 of the printer body 1 can acquire image data by wireless communication with a smartphone or the like. After the user places the printer body 1 on the surface of a recording medium P with the recording face 30 facing the surface of the recording medium P, the user presses the print button 14 once and moves the printer body 1 in the scanning direction (in X-axis direction) as illustrated in FIG. 4, thus forming an image on the recording medium P. The printer body 1 can form an image on the surface of the recording medium in both of forward movement and backward movement in the scanning direction (manual scanning) when the user moves the printer body 1 back and forth.

The recording medium P is not limited to paper, such as paper sheets, but includes any other image formation targets, for example, overhead projector (OHP) sheets, cloth, cardboards, packaging containers, glass, and substrates.

The upper unit 2 is held by the lower unit 3 to open and close with respect to the lower unit 3. The ink cartridge 40 (a liquid discharge or a liquid cartridge) in which an ink tank is integral with a liquid discharge head is mounted inside the lower unit 3. At this time, the recording portion to discharge ink droplets is faced down in the vertical direction. The ink cartridge 40 discharges ink droplets from the recording portion to record an image on a recording medium.

As illustrated in FIG. 3, the recording face 30 of the printer body 1 includes an opening 30a to expose the recording portion of the ink cartridge 40 mounted in the lower unit 3 to the outside. The recording device of the ink cartridge 40 includes a plurality of discharge nozzles 41 (e.g., ports) and is capable of discharging ink droplets separately from the respective discharge nozzles 41 as piezoelectric elements are driven.

As a driving source to discharge ink, the ink cartridge 40 employs, for example, an electromechanical transducer element (piezoelectric actuators) including a lamination-type piezoelectric element or a thin-film-type piezoelectric element; an electrothermal transducer element, such as a heat element; or an electrostatic actuator including a diaphragm and opposed electrodes.

The "ink (liquid)" discharged from the discharge nozzles 41 of the recording portion is not particularly limited as long as the liquid has a viscosity and a surface tension that enable discharge from the discharge nozzles 41. However, it is preferable that the viscosity is 30 mPa·s or less under ordinary temperature and pressure or by heating or cooling. Specifically, the term "liquid" represents, for example, a solution, a suspension, or an emulsion including a solvent, such as water or organic solvent, a colorant, such as a dye or a pigment, a polymerizable compound, a resin, a functional material, such as a surfactant, a biocompatible material, such as deoxyribonucleic acid (DNA), amino acid, protein, or calcium, or an edible material, such as a natural colorant. Such a solution, a suspension, or an emulsion can be used for, e.g., inkjet ink, surface treatment liquid, a liquid for forming components of electronic element or light-emitting element or a resist pattern of electronic circuit, or a material solution for three-dimensional fabrication.

Inside the outer edge of the recording face 30, a position detection sensor 59 as a detector to detect the position of the printer body 1 on the recording medium, a first left roller 17a, a second left roller 17b, a first right roller 18a, and a second right roller 18b that are rotatable are disposed.

When the user moves the printer body 1 in the scanning direction, the four rollers contacting the surface of the recording medium P rotate like tires. Owing to such rollers, the user can move forward or backward the printer body 1 straight in the scanning direction. At this time, only the four rollers of the printer body 1 are in contact with the surface of the recording medium and keep a predetermined distance between the recording face 30 and the surface of the recording medium. Therefore, a constant distance can be maintained between the recording portion of the ink cartridge 40 and the surface of the recording medium, thus forming a desired high-quality image.

The position detection sensor 59 is a sensor to detect the distance to the surface of the recording medium, the surface state (for example, asperities) of the recording medium, and the distance by which the printer body 1 has traveled. The position detection sensor 59 is similar to a sensor used for, for example, an optical mouse (a pointing device) of a personal computer. The position detection sensor 59 irradiates, with light, a place (the recording medium) where the printer body 1 is placed and reads the state of the place as a "pattern". The position detection sensor 59 sequentially detects how the "pattern" moves relative to the movement of the position detection sensor 59, to calculate the amount of movement.

Figure 5:
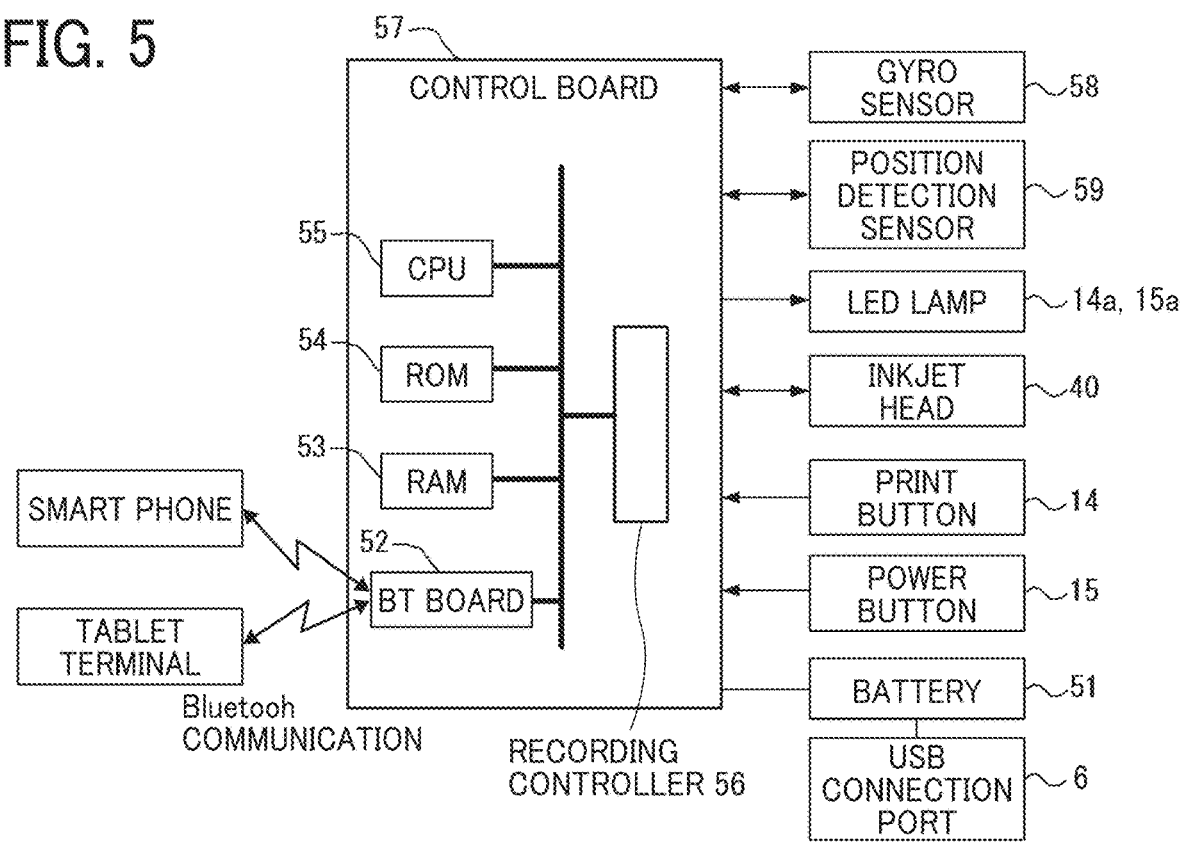
FIG. 5 is a block diagram illustrating part of an electric circuit of the printer body.

FIG. 5 is a block diagram illustrating a portion of an electric circuit of the printer body 1.

A control board 57 includes a central processing unit (CPU) 55 that performs various arithmetic processing and program execution, a Bluetooth (registered trademark, hereinafter "BT") board 52 for short-range wireless communication, a random access memory (RAM) 53 that temporarily stores data, a read-only memory (ROM) 54, and a recording controller 56. The control board 57 is secured at a position on the back side of the USB connection port 6 in a hollow space of the upper unit 2.

The BT board 52 performs data communication by short-range wireless communication (Bluetooth communication) with an external device, such as a smartphone or a tablet terminal. The ROM 54 stores, for example, firmware for hardware control of the printer body 1 and drive waveform data of the ink cartridge 40. The recording controller 56 executes data processing for driving the ink cartridge 40 and generates drive waveforms.

The control board 57 is electrically connected to a gyro sensor 58, the position detection sensor 59, LED lamps 14a and 15a, the ink cartridge 40, the print button 14, the power button 15, the battery 51, and the like.

The gyro sensor 58 detects the tilt and the rotation angle of the printer body 1 and transmits the detection result to the control board 57. The LED lamp 14a is disposed inside an exterior cover, made of a light transmissive material, of the print button 14 and makes the print button 14 luminous. Similarly, the LED lamp 15a is disposed inside an exterior cover made of a light transmissive material of the power button 15 and makes the power button 15 luminous.

When the power button 15 is pressed to turn on the power of the printer body 1, power is supplied to each module. The CPU 55 initiates startup according to the program stored in the ROM 54 and loads the program and each data in the RAM 53. When data of an image to be formed is received from an external device by short-range wireless communication, the recording controller 56 generates a drive waveform corresponding to the image data. The discharge of ink from the ink cartridge 40 is controlled to form an image corresponding to the position on the surface of the recording medium P detected by the position detection sensor 59.

In response to acquisition of image data via short-range wireless communication from an external device, the control board 57 causes the LED lamp 14a to blink so that the light transmissive print button 14, which transmits light, becomes luminous and blinks. Seeing such blinking, the user knows that the image data is being acquired by the printer body 1. The control board 57 causes the LED lamp 14a to keep emitting light when acquisition of image data is completed and the image forming operation is feasible. Seeing such light emission, the user knows that the image forming operation is feasible, and the user places the printer body 1 on the recording medium and presses the print button 14.

Meanwhile, as the control board 57 starts blinking of the LED lamp 14a, the control board 57 waits for pressing of the print button 14. When the print button 14 is pressed, the control board 57 causes the LED lamp 14a to blink so that the print button 14 becomes luminous and blinks. Seeing such blinking, the user knows that printer body 1 is in image forming operation and starts moving (manual scanning) the printer body 1 in the scanning direction.

Finishing moving (manual scanning) of the printer body 1, the user presses the print button 14 again. With such an operation, the control board 57 turns off the LED lamp 14a and stops lighting of the print button 14. Or, there may be a case where the user does not press the print button 14 but picks up the printer body 1 from the recording medium and places the printer body 1 on, for example, a table or mounts the printer body 1 in the cover 8. In this case, at the timing when the user picks up the printer body 1 from the recording medium, the position detection sensor 59 no longer detects the position. At the timing when the position detection sensor 59 stops detecting the position, the control board 57 turns off the LED lamp 14*a* and stops lighting of the print button 14.

It is not necessary to keep pushing the print button 14 while the user moves (manual scanning) the printer body 1. Once the print button 14 is pushed and released before the moving of the printer body 1, the image forming operation based on the detection result by the position detection sensor 59 is continued until the end of the image formation, the print button 14 is pushed again, or the position detection sensor 59 becomes incapable of position detection.

The printer body 1 includes a left roller unit 17 and a right roller unit 18. The left roller unit 17 is attached to an end of the printer body 1 on the left face 32 side in the scanning direction (indicated by arrow X). The right roller unit 18 is attached to an end of the printer body 1 on the right face 33 side in the scanning direction.

The left roller unit 17 includes a metal shaft 17*c*, the first left roller 17*a* secured to one end side in the longitudinal direction of the shaft 17*c*, and the second left roller 17*b* secured to the other end side of the shaft 17*c*. Each of the first left roller 17*a* and the second left roller 17*b* is made of a material, such as rubber, having a relatively large frictional resistance.

The right roller unit 18 includes a metal shaft 18*c*, the first right roller 18*a* secured to one end side in the longitudinal direction of the shaft 18*c*, and the second right roller 18*b* secured to the other end side of the shaft 18*c*. Each of the first right roller 18*a* and the second right roller 18*b* is made of a material, such as rubber, having a relatively large frictional resistance.

As the both of two end portions of the shaft 17*c* in the longitudinal direction are fitted in sliding bearings fixed to the printer body 1, the left roller unit 17 is rotatably held by the sliding bearings. Similar to the left roller unit 17, the right roller unit 18 is rotatably held by sliding bearings 72 fixed to the printer body 1.

The left roller unit 17 and the right roller unit 18 are for enhancing the straight traveling performance of the printer body 1 in the scanning direction (indicated by arrow X). While the first left roller 17*a* and the second left roller 17*b* secured to the shaft 17*c* rotate together as one unit, the first right roller 18*a* and the second right roller 18*b* secured to the shaft 18*c* rotate together as one unit, thus improving the straight traveling performance.

In the printer body 1 according to the present embodiment, the rollers 17*a* and 17*b* of the left roller unit 17 and the rollers 18*a* and 18*b* of the right roller unit 18 are disposed at positions deviating from the recording portion in the orthogonal direction (indicated by arrow Y) to the scanning direction. In such an arrangement, when the printer body 1 is moved, the rollers 17*a*, 17*b*, 18*a*, and 18*b* are inhibited from contacting an image portion immediately after formed. Therefore, the image can be protected from being disturbed by the rollers 17*a*, 17*b*, 18*a*, and 18*b* contacting the image portion.

As described above, the shafts 17*c* and 18*c* as rotation shafts of the roller units 17 and 18 are made of metal. Compared with a structure using a nonmetallic shaft, use of the metal shaft is advantageous in suppressing bend of the shaft during moving of the printer body 1, thereby inhibiting the image from being disturbed by unstable traveling of the printer body 1 due to the flexure of the shaft. Further, the printer body 1 can be compact when a shaft having a small diameter is used.

Here, in the configuration provided with the rollers 17*a*, 17*b*, 18*a*, and 18*b* like the printer body 1 according to the present embodiment, as described above, when the user moves the printer body 1 in the scanning direction (manual scanning), the straight traveling performance is secured. However, the rollers 17*a*, 17*b*, 18*a*, and 18*b* inhibit smooth traveling when the printer body 1 is moved along a curved track, thus inhibit smooth manual scanning.

In addition, when recording on the second line is performed after recording on the first line, a line feed operation is required to move the printer body 1 in the scanning orthogonal direction with the recording face 30 kept facing the surface of the recording medium so that position detection by the position detection sensor 59 is not disabled. Also in the line feed operation, the rollers 17*a*, 17*b*, 18*a*, and 18*b* of the printer body 1 may inhibit the movement in the scanning orthogonal direction and become a hindrance to a smooth line feed operation.

Therefore, the handheld printer 10 of the present embodiment is provided with the spacer 4 which is attachable to and detachable from the recording face 30 of the printer body 1, and the usage form of the handheld printer 10 can be switched by attaching and detaching the spacer 4. Specifically, the usage form can be switched between a roller contact state in which scanning is performed while the rollers 17*a*, 17*b*, 18*a* and 18*b* are in contact with the surface of the table on which the recording medium P is placed or the surface of the recording medium P and a roller contactless state in which the rollers 17*a*, 17*b*, 18*a* and 18*b* are not in contact with the surface of the table on which the recording medium P is placed or the surface of the recording medium P.

Figure 6:
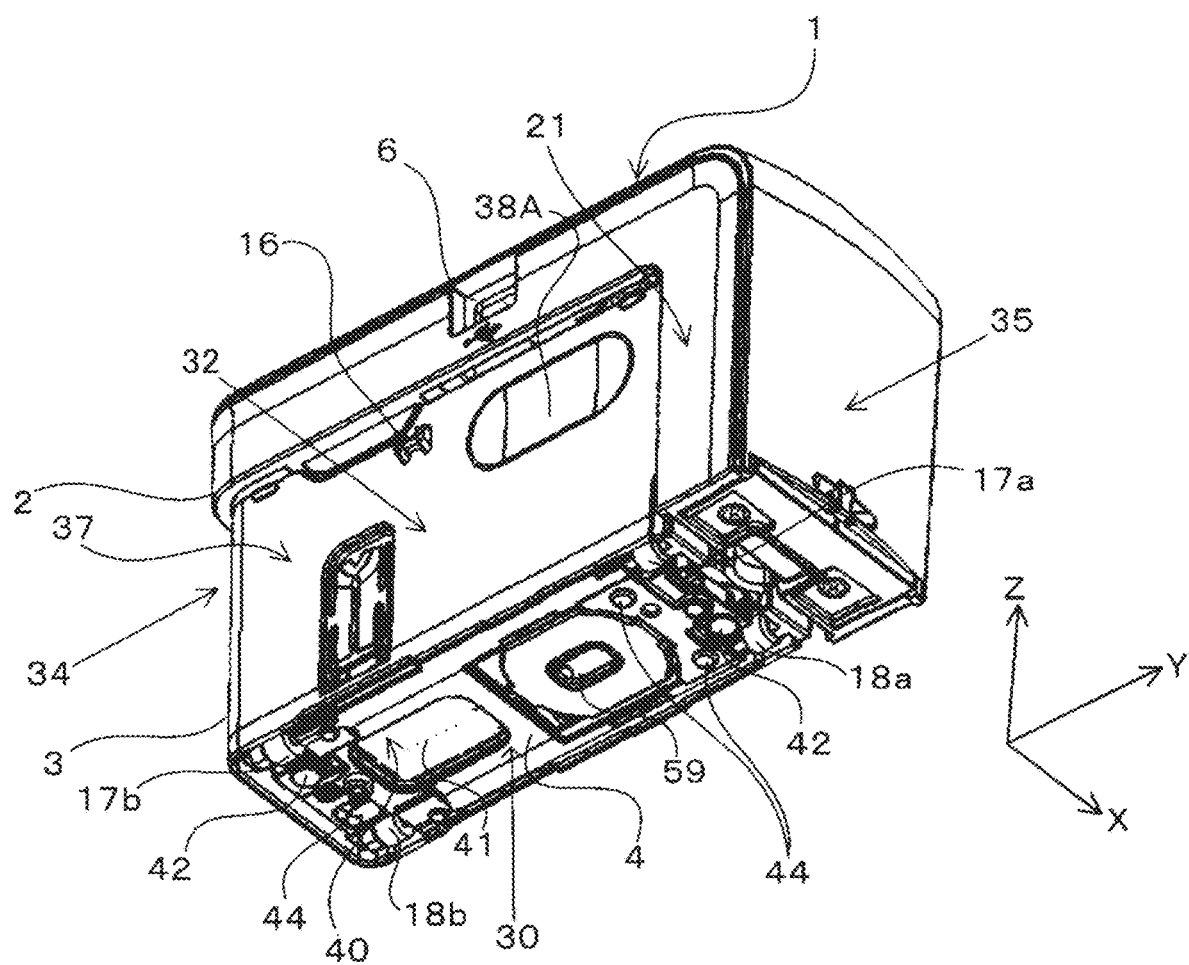
FIG. 6 is an exterior perspective view of the printer body in a state where the spacer member is attached, viewed from obliquely below.

FIG. 6 is an exterior perspective view of the printer body 1 in a state in which the spacer 4 is attached, as viewed obliquely from below.

When the spacer 4 is detached from the printer body 1, the handheld printer 10 can be used in the roller contact state in which the printer body 1 is moved for scanning with the rollers 17*a*, 17*b*, 18*a*, and 18*b* of the printer body 1 in contact with and rolling on the surface of the recording medium P as illustrated in FIG. 3. As a result, owing to straight traveling performance of the rollers 17*a*, 17*b*, 18*a*, and 18*b*, the user can easily move the printer body 1 straight along the scanning direction and can form an appropriate image. On the other hand, when the spacer 4 is attached to the recording face 30 of the printer body 1, the handheld printer 10 can be used in the roller contactless state in which the printer body 1 is moved for scanning with the rollers 17*a*, 17*b*, 18*a*, and 18*b* of the printer body 1 contactless with the surface of the recording medium P and the like as illustrated in FIG. 6.

The spacer 4 is attached to and detached from the recording face 30 of the lower unit 3 with magnets. Specifically, the spacer 4 includes magnets 42, and screw heads 39*a* of two metal screws (fastening members) that are magnetic are exposed to the recording faces 30. The magnets 42 are disposed to oppose the screw heads 39*a* when the spacer 4 is attached to the recording face 30 of the printer body 1. In the present embodiment, the magnetic body provided on the spacer 4 is described as an example of a fastening member such as a metal screw, but may be a frame member such as a metal frame of the spacer 4. Such a frame member is usually made of metal in order to secure rigidity and can be used as a magnetic body.

Further, as illustrated in FIG. 3, in order to align the recording face 30 of the lower unit 3 with the spacer 4, an alignment projection 39*b* and an alignment hole 39*c* are formed on the recording face 30. On the spacer 4, an alignment hole 43 where the alignment projection 39b fits and an alignment projection which fits in the alignment hole 39c are formed at respective corresponding positions. When the spacer 4 is properly aligned with the recording face 30 such that the alignment projection and the alignment hole fit in and around the alignment hole and alignment projection on the other side, the magnets 42 on the spacer 4 face the screw heads 39a of the recording face 30. Then, as illustrated in FIG. 6, the spacer 4 is mounted and held onto the recording face 30 by the magnetic force of the magnets 42.

The body of the spacer 4 is made of resin such as ABS resin. Three projections 44 to support the printer body 1 are provided on a recording medium opposing side) of the spacer 4, which is opposite the side facing the recording face 30 when the spacer 4 is attached to the printer body 1. The tips of the projections 44 of the spacer 4 mounted on the recording face 30 of the printer body 1 are farther from the recording face 30 than the rollers 17a, 17b, 18a, and 18b in the direction in which the recording side faces the recording medium P. Therefore, when the printer body 1 to which the spacer 4 is attached is placed on the recording medium P, the tips of the projections 44 contact the recording face 30 to float the rollers 17a, 17b, 18a, and 18b from the surface of the recording medium P. Then, the handheld printer 10 is in the roller contactless state.

To use the handheld printer 10 in the roller contactless state, the user holds the printer body 1 and places the printer body 1 on the recording medium P so that the recording face 30 to which the spacer 4 is attached opposes the surface of the recording medium P. At that time, the printer body 1 is supported at three points by the projections 44 of the spacer 4 so that the rollers 17a, 17b, 18a, and 18b float from the surface of the recording medium P. Then, the user can move the printer body 1 (manual scanning) so that the three projections 44 slide on the surface of the recording medium P, to form an image on the recording medium P.

Figure 7:
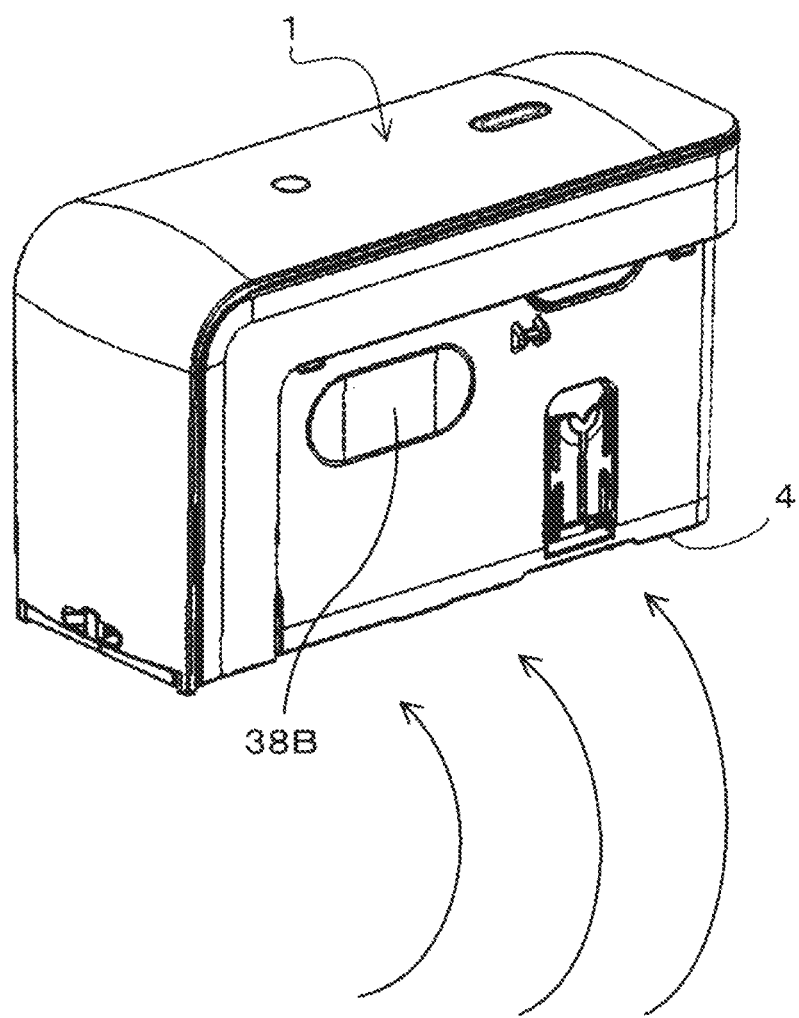
FIG. 7 is an explanatory diagram illustrating an aspect where the printer body having a non-contact type roller is operated to move along a curved trajectory.

FIG. 7 is a perspective view illustrating the printer body 1 being moved along a curved track in the roller contactless state.

In the roller contactless state, since the rollers 17a, 17b, 18a, and 18b float from the surface of the recording medium P, an operation of moving the printer body 1 (manual scanning) in a direction different from the scanning direction (X-axis direction) is not disturbed by the rollers 17a, 17b, 18a, and 18b. Therefore, the curved traveling performance of the printer body 1 is improved compared to the roller contact state. As a result, the printer body 1 can be easily moved along the curved track.

In addition, in a case where, after recording of the first line in the scanning direction, recording of the second line is performed at a position different in the scanning orthogonal direction, the rollers 17a, 17b, 18a, and 18b do not disturb the line feed operation to move the printer body 1 in the scanning orthogonal direction with the recording face 30 kept facing the recording medium. Therefore, the operability of the line feed operation is improved compared to the roller contact state. In the roller contactless state, since the straight traveling performance by the rollers 17a, 17b, 18a, and 18b is not feasible, the user needs to move the printer body 1 straight in the scanning direction without assistance from the rollers 17a, 17b, 18a, and 18b.

Each of the three projections 44 of the spacer 4 is disposed out of the range of the recording portion (where the plurality of discharge nozzles 41 are located) of the ink cartridge 40 in the direction (Y-axis direction) orthogonal to the scanning direction. Thus, the image can be protected from being disturbed by the projections 44 rubbing against the image portion immediately after formed during image formation in the roller contactless state.

Operation of taking out the ink cartridge 40 from the handheld printer 10 in the present embodiment will be described next.

Figure 8:
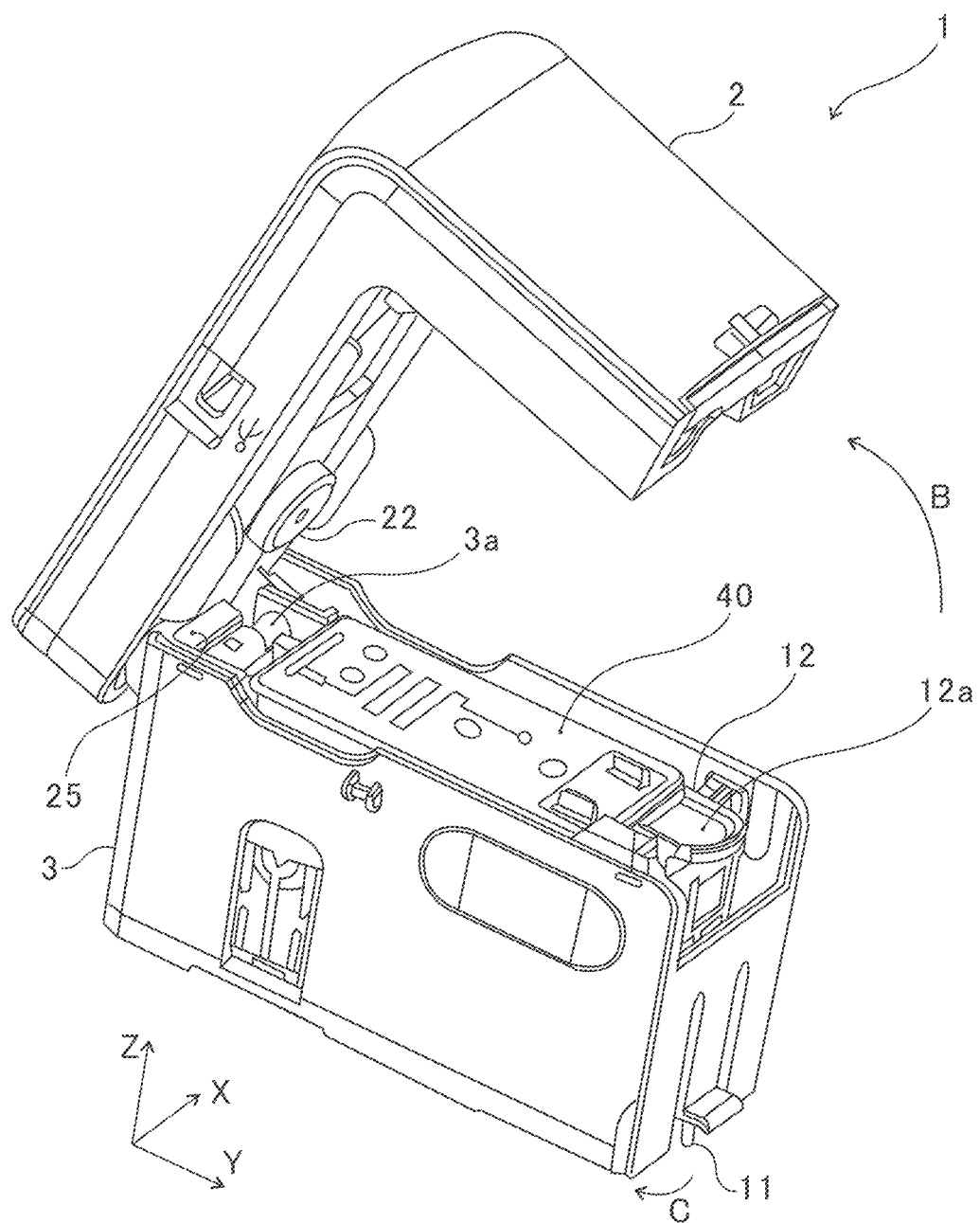
FIG. 8 is an exterior perspective view of the printer body in a state where an upper unit is open.

FIG. 8 is a perspective view of the printer body 1 illustrating a state where the upper unit 2 is open by being rotated in the direction indicated by arrow B in FIG. 8 with respect to the lower unit 3.

At a lower part on an end face on a front face side of the lower unit 3 of the printer body 1, a lock claw 11 is disposed. By the lock claw 11 being operated so as to move in the direction indicated by arrow C in FIG. 8, the upper unit 2 is unlocked with the lower unit 3. In such a released state, the upper unit 2 is rotated, relative to the lower unit 3, around the upper unit rotation shaft 3a in the direction indicated by arrow B in FIG. 8. Then, the upper unit 2 is open as illustrated in FIG. 8.

When the upper unit 2 is open, the ink cartridge 40 which is a replacement part disposed inside the printer body 1 and a cartridge attaching and detaching mechanism 12 to move and press the ink cartridge 40 are exposed. Further, on an inner face of the upper unit 2, a head pressing device 22 for pressing and locking the ink cartridge 40 attached inside the lower unit 3 is provided.

Figure 9:
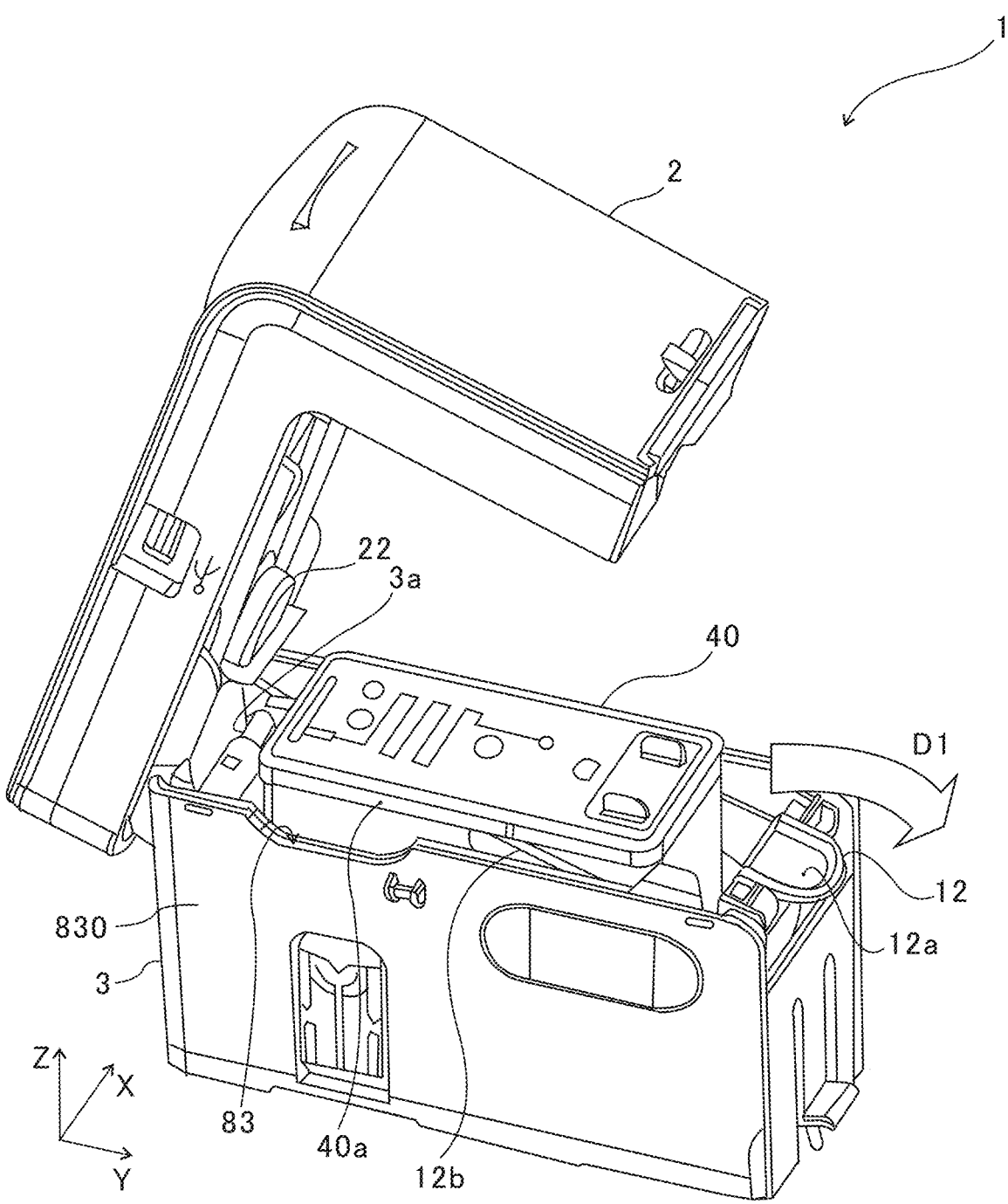
FIG. 9 is a perspective explanatory diagram of the printer body in a state where an ink cartridge is lifted up.

FIG. 9 is a perspective view of the handheld printer 10 in a state in which the ink cartridge 40 is pushed up by operating an operation portion 12a (e.g., a lever or a handle) of the cartridge attaching and detaching mechanism 12 of the handheld printer 10 in the state illustrated in FIG. 8.

By the operation portion 12a of the cartridge attaching and detaching mechanism 12 being open by being dragged to a front face side as indicated with an arrow D1 in FIG. 9, the ink cartridge 40 is lifted up from the state illustrated in FIG. 8 (state where the ink cartridge 40 is located at the set position), and is put into a state illustrated in FIG. 9 (state where the ink cartridge 40 is located at the attaching and detaching position), so that the ink cartridge 40 can be taken out.

Figure 10A:
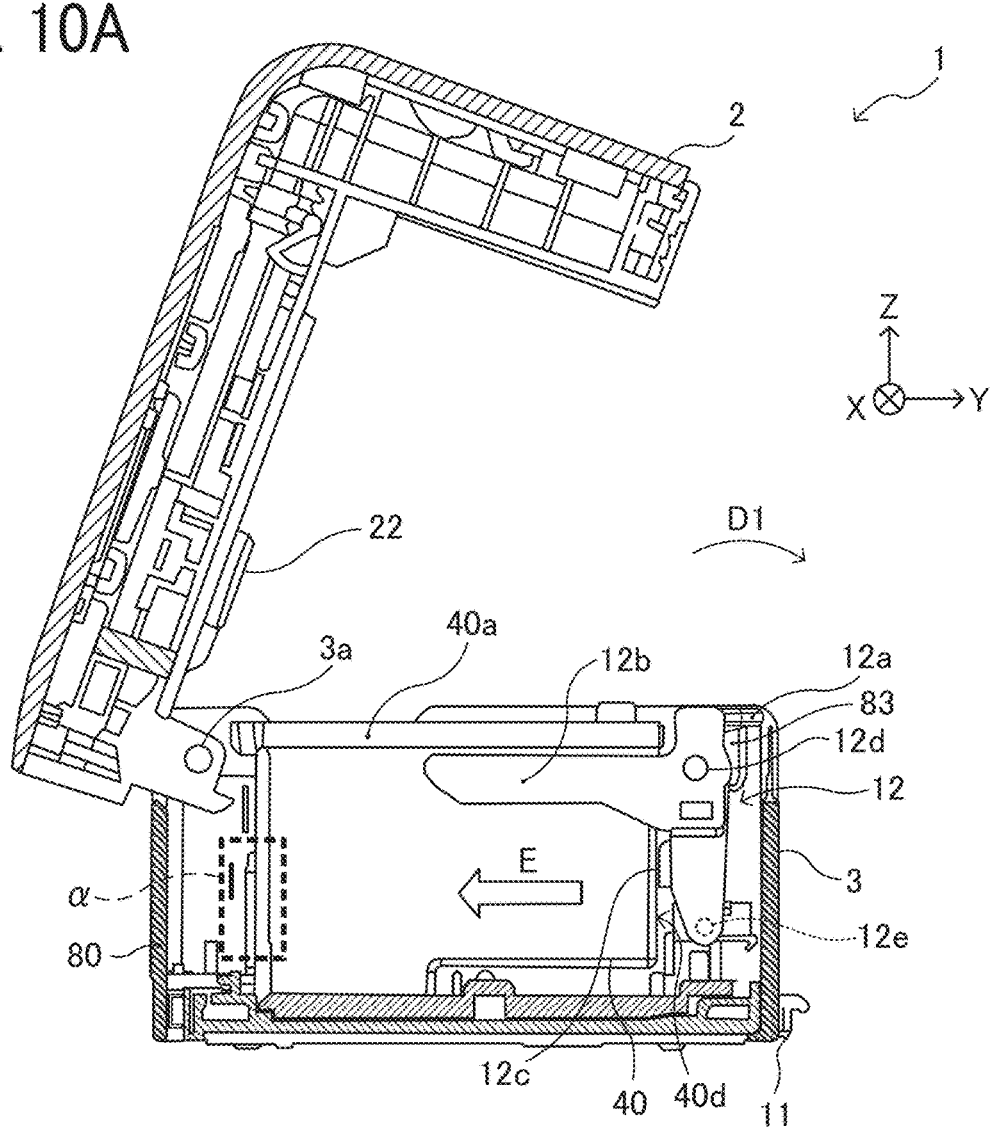
FIG. 10A is a cross-sectional view of a position on an inner wall face on a left face side of the printer body.

FIG. 10A is a cross-sectional view of the printer body 1 illustrated in FIG. 8, viewed from a left face 32 side.

Figure 10B:
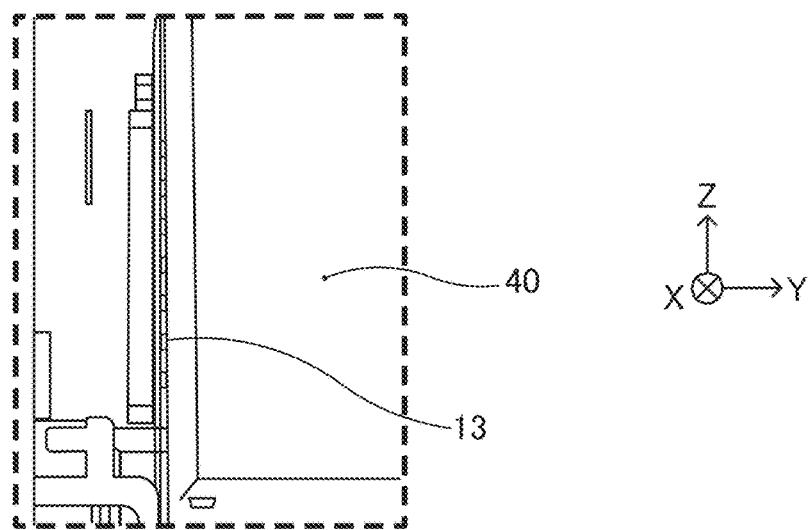
FIG. 10B is an enlarged cross-sectional view of a region a indicated with a dashed line in FIG. 10A.

FIG. 10A illustrates a cross-sectional view of a position on an inner wall face on a side of the left face 32 of the printer body 1. Further, FIG. 10B is an enlarged cross-sectional view of a region α indicated with a dashed line in FIG. 10A.

As illustrated in FIG. 10A, a pressing portion 12c presses a pressed face 40d on the front face side (right side in FIG. 10A) of the ink cartridge 40, as indicated with an arrow E in FIG. 10A, thereby pressing the ink cartridge 40 to the rear face side (left side in FIG. 10A). Thus, the pressing portion 12c serves as a pressing device of the cartridge attaching and detaching mechanism 12. By this, a contact portion of the ink cartridge 40 is pressurized at a flexible printed circuit (FPC) contact portion 13 provided at the printer body 1.

Figure 11B:
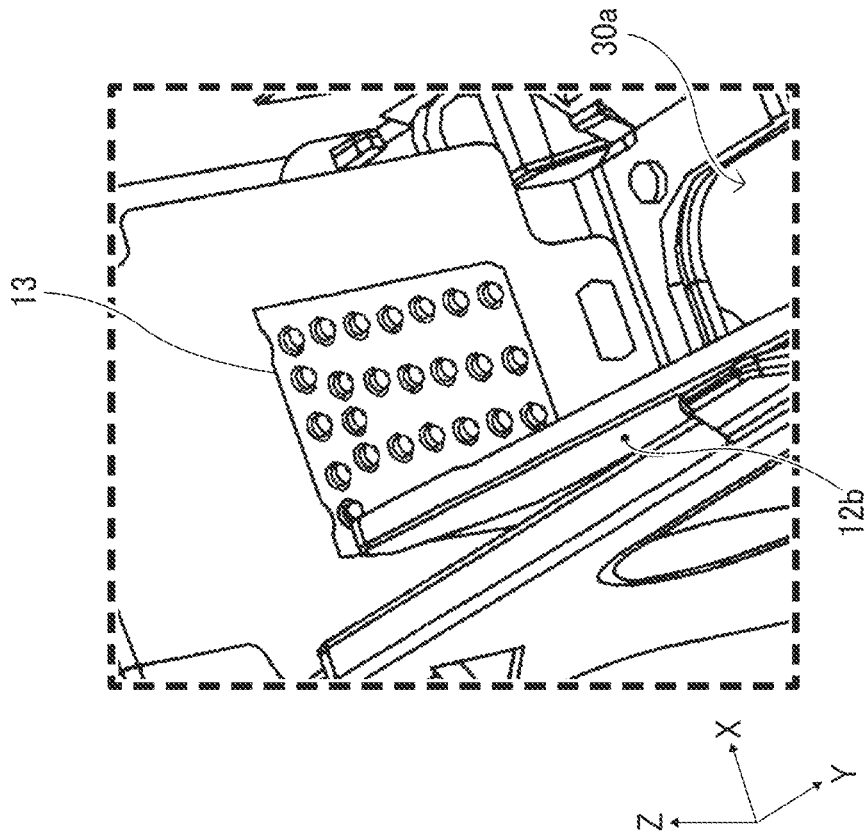
FIG. 11B is an enlarged perspective view of a region $_R$ indicated with a dashed line in FIG. 11A.
Figure 11A:
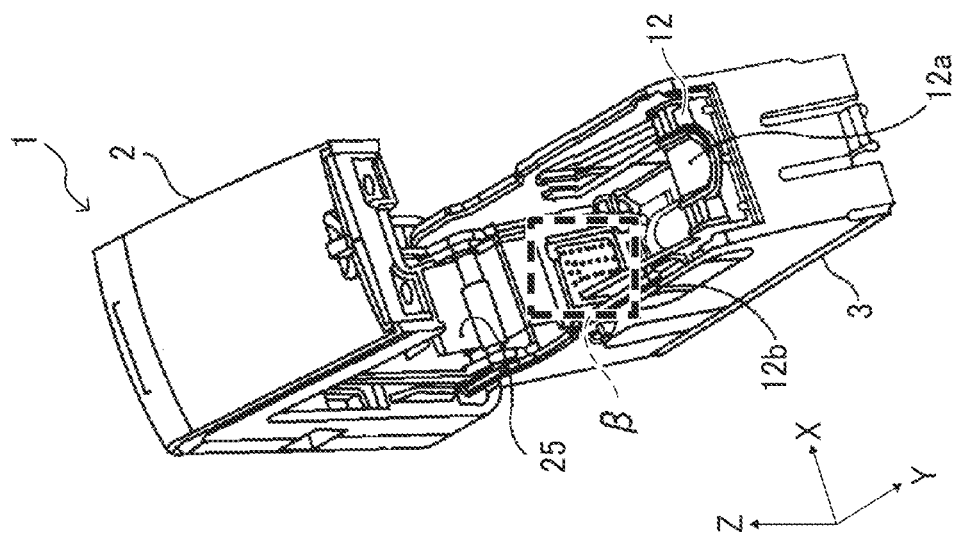
FIG. 11A is a perspective explanatory diagram of the printer body in a state where the upper unit is open and the ink cartridge is taken out, viewed from obliquely above of a front face side.

FIG. 11A is a perspective explanatory diagram of the printer body 1 in a state where the upper unit 2 is open and the ink cartridge 40 is taken out, viewed from obliquely above on a front face side.

FIG. 11B is an enlarged perspective view of a region β indicated with a dashed line in FIG. 11A.

As illustrated in FIG. 11A, on an inner wall face on a rear face side of space in which the ink cartridge 40 is disposed in the lower unit 3, the FPC contact portion 13 is disposed.

Figure 12A:
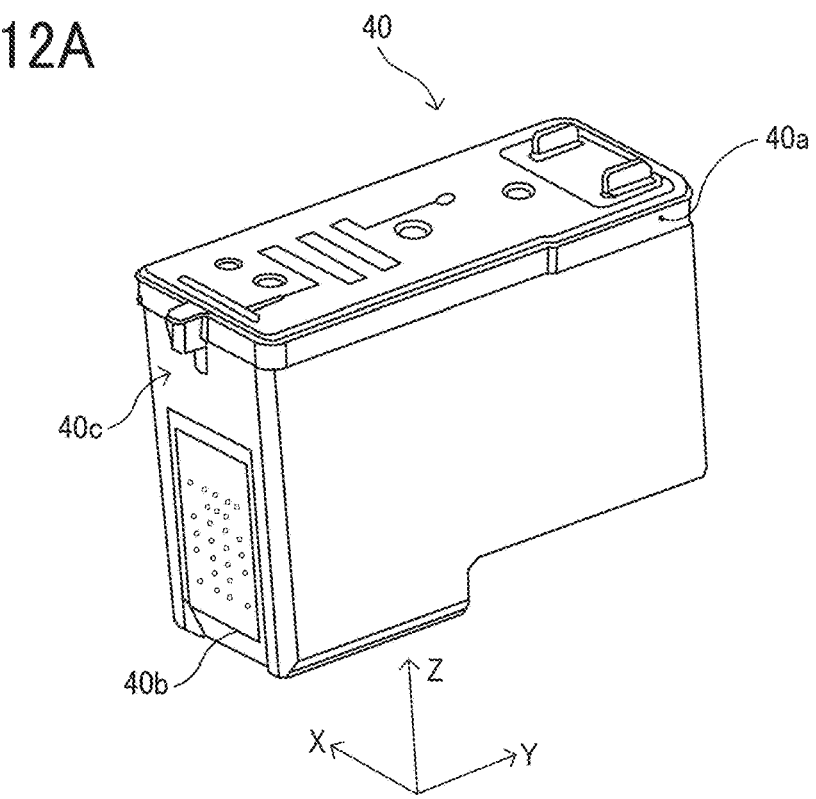
FIG. 12A is a perspective explanatory diagram of the ink cartridge viewed from above on a left rear face side.
Figure 12B:
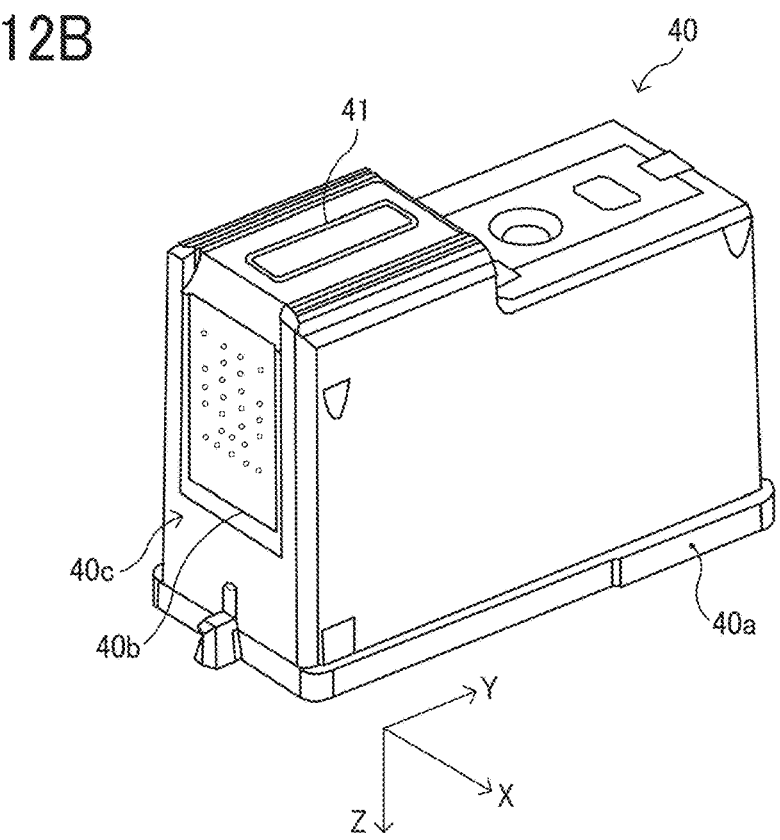
FIG. 12B is a perspective explanatory diagram of the ink cartridge viewed from below on a right rear face side.

FIGS. 12A and 12B are perspective explanatory diagrams of the ink cartridge 40 alone.

FIG. 12A is a perspective explanatory diagram of the ink cartridge 40 viewed from above on a left rear face side, and FIG. 12B is a perspective explanatory diagram of the ink cartridge 40 viewed from below on a right rear face side.

As illustrated in FIGS. 12A and 12B, a cartridge contact portion 40b is disposed on a guided face 40c which is an external wall face on the rear face side of the ink cartridge 40.

By the ink cartridge 40 being attached to the lower unit 3, and the FPC contact portion 13 and the cartridge contact portion 40b being electrically connected to each other, power is supplied from a battery 51 to the ink cartridge 40. Further, an electrical signal which controls the ink cartridge 40 is transmitted to the ink cartridge 40.

As illustrated in FIG. 8, a flexible flat cable 25 is disposed on a side of the rear face 34 of the upper unit rotation shaft 3a, and connects a control board 57 inside the upper unit 2 and the FPC contact portion 13 inside the lower unit 3. The flexible flat cable 25 can deform in accordance with opening and closing operation of the upper unit 2, and a connection state between the control board 57 and the FPC contact portion 13 can be maintained even if opening and closing operation of the upper unit 2 is repeated.

Figure 13:
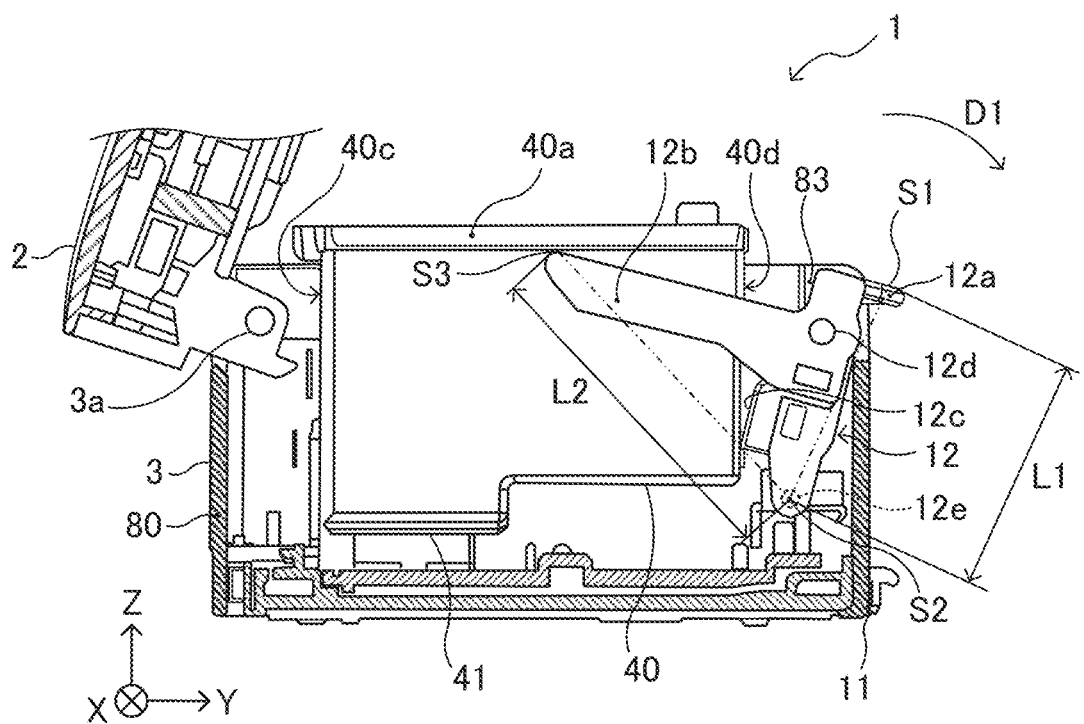
FIG. 13 is a cross-sectional view of the printer body viewed from a left face side.

FIG. 13 is a cross-sectional view of the printer body 1 viewed from the left face 32 side. FIG. 13 is a cross-sectional view illustrating a cross-section of the printer body 1 at a position on the inner wall face of the wall on the left face 32 side in a similar manner to FIGS. 10A and 10B.

As the operation portion 12a of the cartridge attaching and detaching mechanism 12 is pulled to the front face side as indicated by arrow D1 in FIG. 13, the cartridge attaching and detaching mechanism 12 rotates, centering on a rotation shaft 12e of the cartridge attaching and detaching mechanism 12. At this time, the cartridge attaching and detaching mechanism 12 rotates until a stopper convex portion 12d provided at the cartridge attaching and detaching mechanism 12 is fitted in a stopper groove provided on the inner wall face of the printer body 1. Through this rotation, a push-up lever 12b which is a moving member of the cartridge attaching and detaching mechanism 12 pushes up the flange portion 40a which is a projecting portion of the ink cartridge 40, and the ink cartridge 40 is lifted up from the state illustrated in FIG. 8, and is put into the state illustrated in FIG. 9 (state illustrated in FIG. 13). By this, the ink cartridge 40 can be taken out.

In the printer body 1 in the present embodiment, by the lock claw 11 being operated, the upper unit 2 is unlocked with the lower unit 3, and the upper unit 2 is open. By the cartridge attaching and detaching mechanism 12 which is exposed by this operation being operated, the ink cartridge 40 is lifted up. As the cartridge attaching and detaching mechanism 12, it is also possible to employ a mechanism of lifting up the ink cartridge 40 in conjunction with operation of opening the upper unit 2.

In a case where the ink cartridge 40 is attached to the printer body 1, the ink cartridge 40 is set in a hollow portion of the lower unit 3 of the printer body 1 in a state where the upper unit 2 is open. At this time, operation of pressing an upper face of the ink cartridge 40 attached in the state illustrated in FIG. 9 (state in which the ink cartridge 40 is located at an attaching and detaching position) is performed, so that the ink cartridge 40 is inserted until the state illustrated in FIG. 8 (state where the ink cartridge 40 is located at the set position), and the upper unit 2 is closed. It is thereby possible to form an image using the attached ink cartridge 40.

Further, in the handheld printer 10 in the present embodiment, the upper unit 2 can be closed in the state illustrated in FIG. 9 without pressing the upper face of the ink cartridge 40 attached in the handheld printer 10 as illustrated in FIG. 9. In this case, the upper face of the ink cartridge 40 located at a position where the ink cartridge 40 is lifted up (attaching and detaching position) is pressed with the head pressing device 22 of the upper unit 2, so that the ink cartridge 40 is inserted until the state becomes the state illustrated in FIG. 8 (state where the ink cartridge 40 is located at the set position).

In the printer body 1 in the present embodiment, only the upper unit 2 is open and closed upon attachment and detachment of the ink cartridge 40. Therefore, compared to a configuration where a plurality of such opening and closing members is provided, it is possible to simplify the configuration and make a size of the device smaller, and, further, as a result of the number of parts which are to be open and closed by a user being reduced, it is possible to reduce the number of steps of operation upon attachment and detachment of the ink cartridge 40, so that it is possible to improve operability.

A configuration and operation when the ink cartridge 40 is attached to the printer body 1 will be described next.

Figure 14:
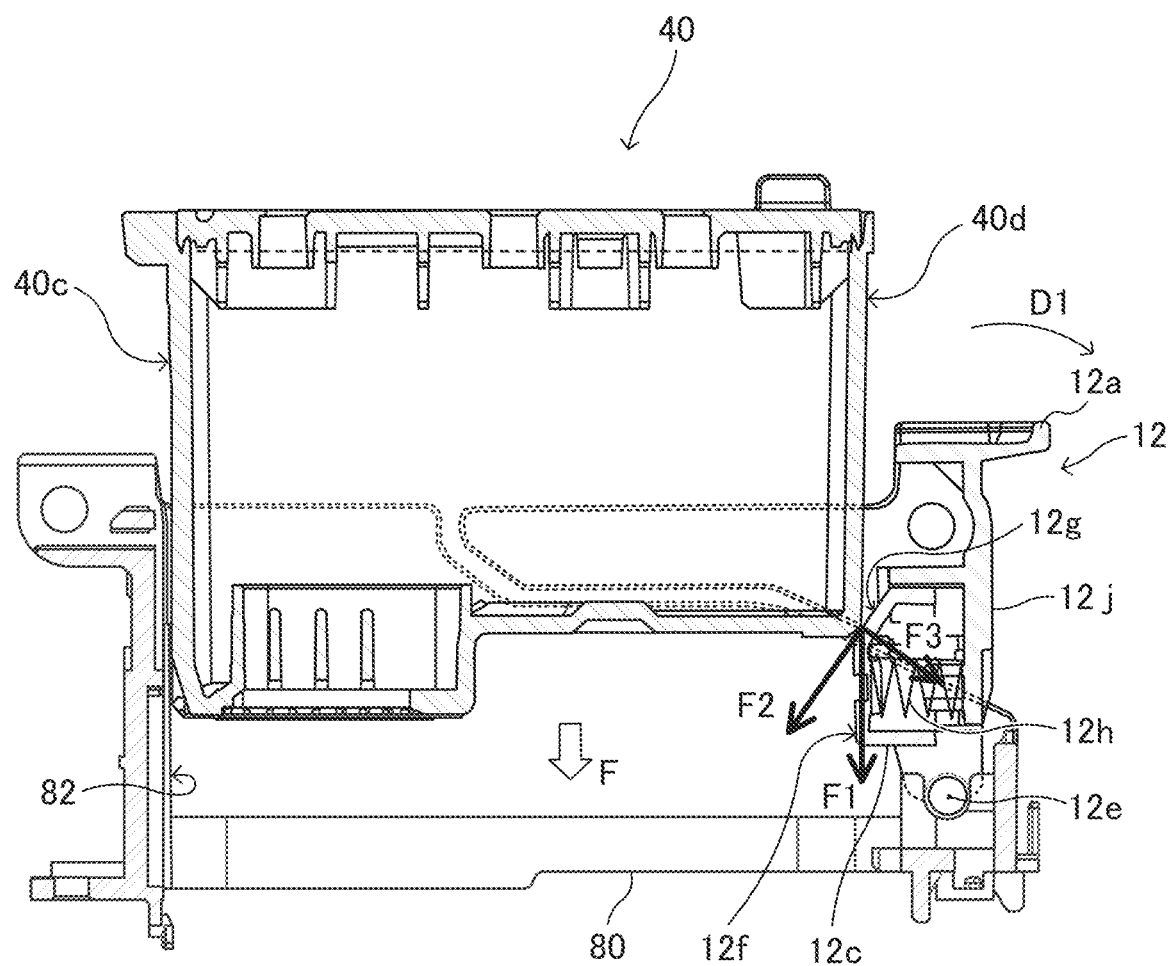
FIG. 14 is a cross-sectional view illustrating a state where the ink cartridge is inserted into a lower unit, and the ink cartridge is in contact with a pressurizer.

FIG. 14 is a cross-sectional view illustrating a state where the ink cartridge 40 is inserted into the lower unit 3, and the ink cartridge 40 is in contact with the pressing portion 12c.

The pressing portion 12c of the cartridge attaching and detaching mechanism 12 is held by a pressing portion holder 12j so as to be able to slide in the direction to press the pressed face 40d of the ink cartridge 40 (to the left in FIG. 14). The pressing portion holder 12j is integral with the operation portion 12a, the push-up lever 12b, and the rotation shaft 12e.

Inside the pressing portion 12c, a pressure spring 12h which presses the pressing portion 12c in a direction drawing away from the pressing portion holder 12j is disposed. While the pressing portion 12c pressed by the pressure spring 12h moves away from the pressing portion holder 12j, a claw portion of the pressing portion 12c is hooked at the pressing portion holder 12j. Thus, the pressing portion 12c is not separated from the pressing portion holder 12j.

Further, the pressing portion 12c includes a pressurizing face 12f and an inclined face 12g. The pressurizing face 12f contacts and pressurizes the pressed face 40d which is an external wall face (on the right side in FIG. 14) on a printer front face side of the attached ink cartridge 40. The inclined face 12g is located above the pressurizing face 12f and inclined with respect to the pressurizing face 12f. In a state where the operation portion 12a is not drawn to the front face side as illustrated in FIG. 14, the pressurizing face 12f is substantially parallel to a vertical plane, and the inclined face 12g faces obliquely upward.

If the ink cartridge 40 is inserted into the lower unit 3, as illustrated in FIG. 14, the ink cartridge 40 is in contact with the pressing portion 12c. At this time, as indicated with arrow F in FIG. 14, the ink cartridge 40 inserted downward in the vertical direction is in contact with the inclined face 12g of the pressing portion 12c and exerts a downward force F1 in the vertical direction. Because the inclined face 12g is inclined with respect to the vertical direction, force F3 (component force) perpendicular to the inclined face 12g acts on the pressing portion 12c. Then, the pressing portion holder 12j is pressed, via the pressing portion 12c and the pressure spring 12h, by the component force F3 and rotates around the rotation shaft 12e in the direction indicated by arrow D1 in FIG. 14.

At this time, while the pressing portion 12c contacts the pressurized face (pressed face) 40d of the ink cartridge 40, the claw portion of the pressing portion 12c is still hooked at the pressing portion holder 12j. Therefore, the pressing force of the pressure spring 12h does not act on the ink cartridge 40.

Figure 15:
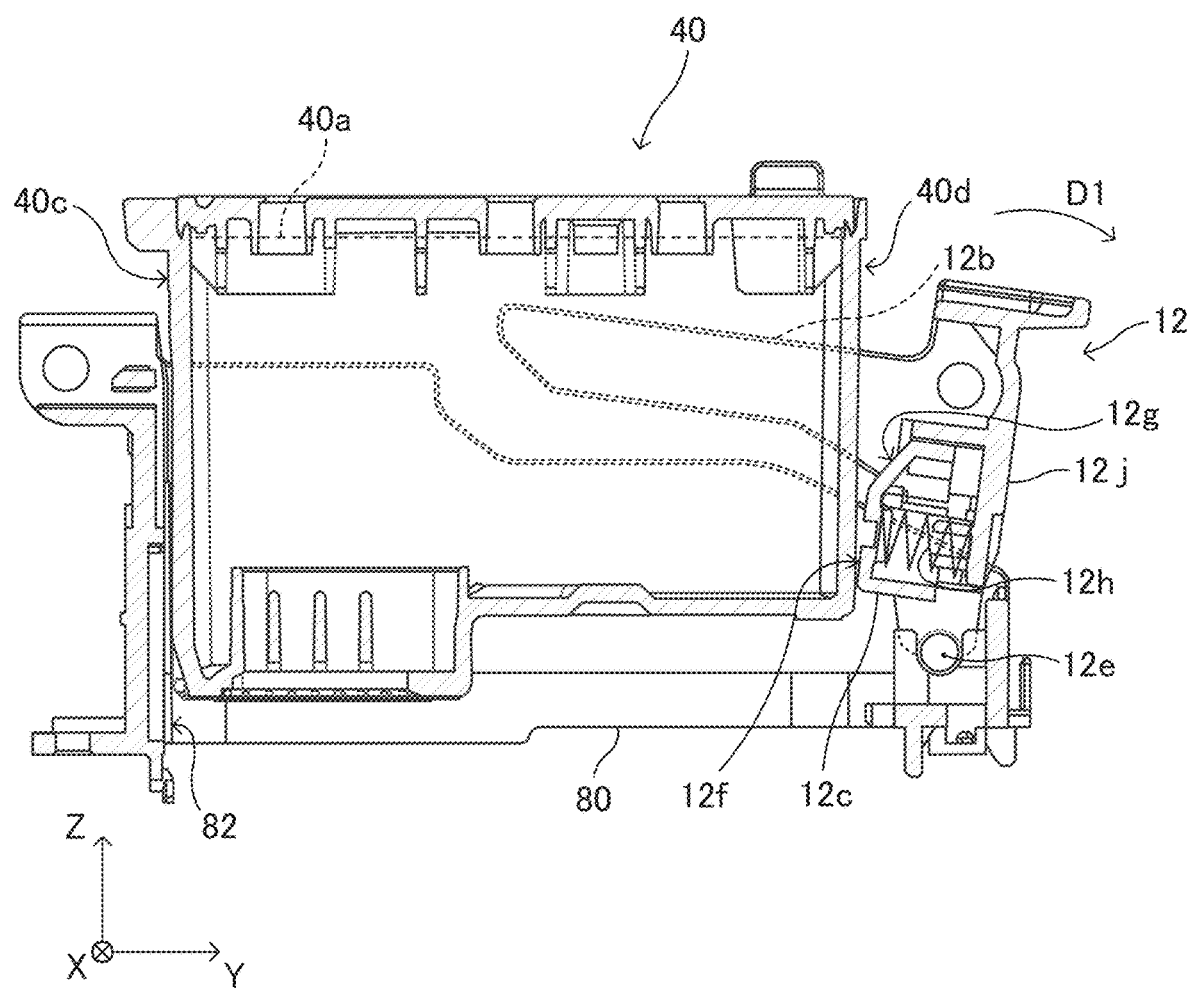
FIG. 15 is a cross-sectional view illustrating a state where the ink cartridge is further inserted from the state illustrated in FIG. 14.

FIG. 15 is a cross-sectional view illustrating a state where the ink cartridge 40 is further inserted from the state illustrated in FIG. 14.

As the ink cartridge 40 is further inserted from the state illustrated in FIG. 14, the contact portion with the ink cartridge 40 shifts from the inclined face 12g to the pressurizing face 12f, so that the pressurizing face 12f comes into contact with the ink cartridge 40. At this time, the pressurizing face 12f faces obliquely upward as a result of the contact with the ink cartridge 40. Accordingly, the force of the ink cartridge 40 acts on the pressurizing face 12f, causing the pressing portion holder 12j to rotate in the direction indicated by arrow D1 to the state illustrated in FIG. 15. Even in the state illustrated in FIG. 15, the pressing force of the pressure spring 12h does not act on the ink cartridge 40.

Figure 16:
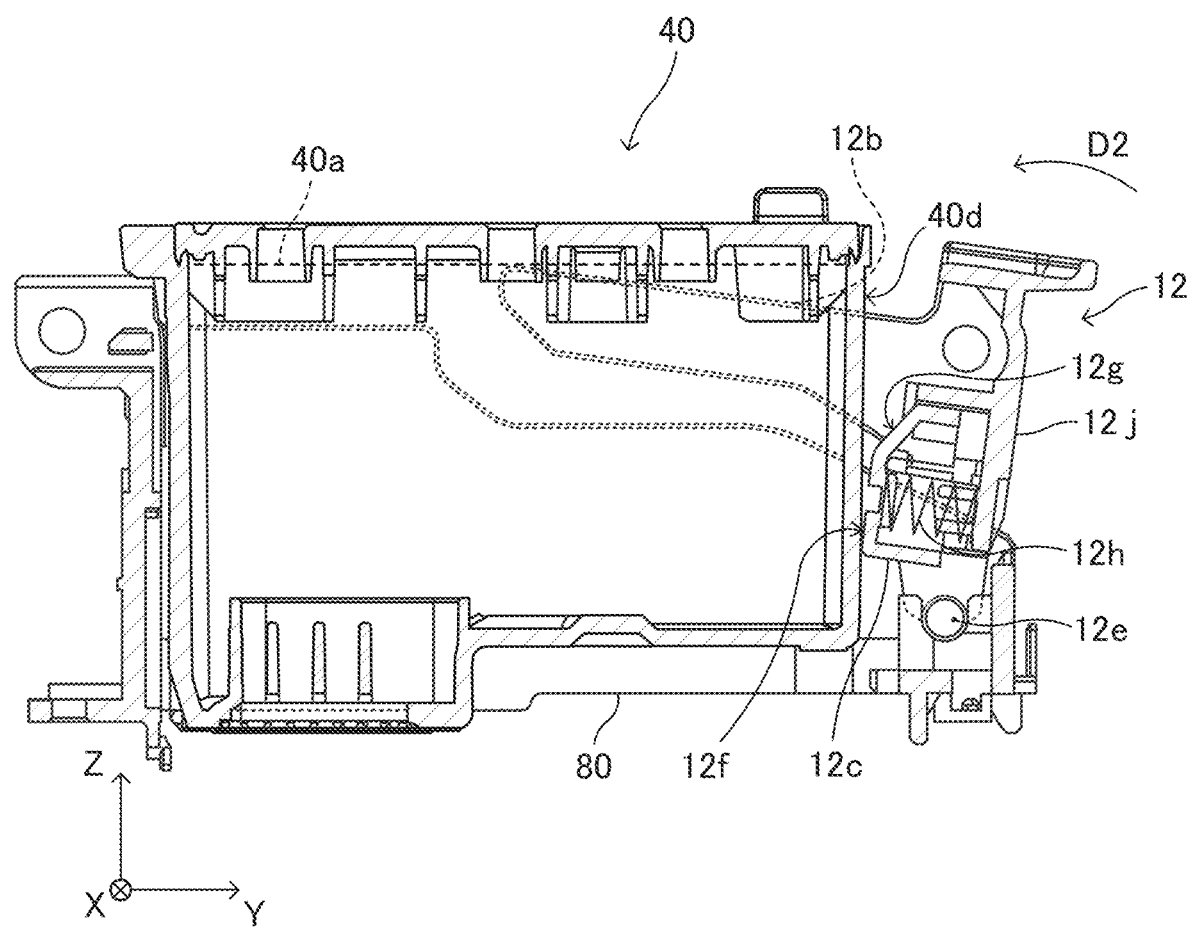
FIG. 16 is a cross-sectional view illustrating a state where a flange portion of the inserted ink cartridge is in contact with a push-up lever.

FIG. 16 is a cross-sectional view illustrating a state where the flange portion 40a of the inserted ink cartridge 40 is in contact with the push-up lever 12b (state where the ink cartridge 40 is located at the attaching and detaching position).

The ink cartridge 40 moves in the direction (vertical in FIG. 16) orthogonal to the pressing direction (lateral direction in FIG. 16) by the pressing portion 12c, and the flange portion 40a (a projecting portion) is disposed on face(s) on the side along the moving direction of the ink cartridge 40 (on the right and left sides of the printer body 1, that is, on the front side and/or the back side of the paper bearing FIG. 16). When the ink cartridge 40 is further inserted from the state illustrated in FIG. 15, as illustrated in FIG. 16, the flange portion 40a contacts the push-up lever 12b located on the same side as the flange portion 40a. As the ink cartridge 40 is further inserted, the push-up lever 12b is pushed downward by the flange portion 40a, and the pressing portion holder 12j integral with the push-up lever 12b rotates in the direction indicated by arrow D2 in FIG. 16. By this rotation, a relative distance between the ink cartridge 40 and the pressing portion holder 12j becomes narrower, the pressure spring 12h is compressed, and the pressing force of the pressure spring 12h starts to act on the ink cartridge 40 via the pressing portion 12c.

Figure 17:
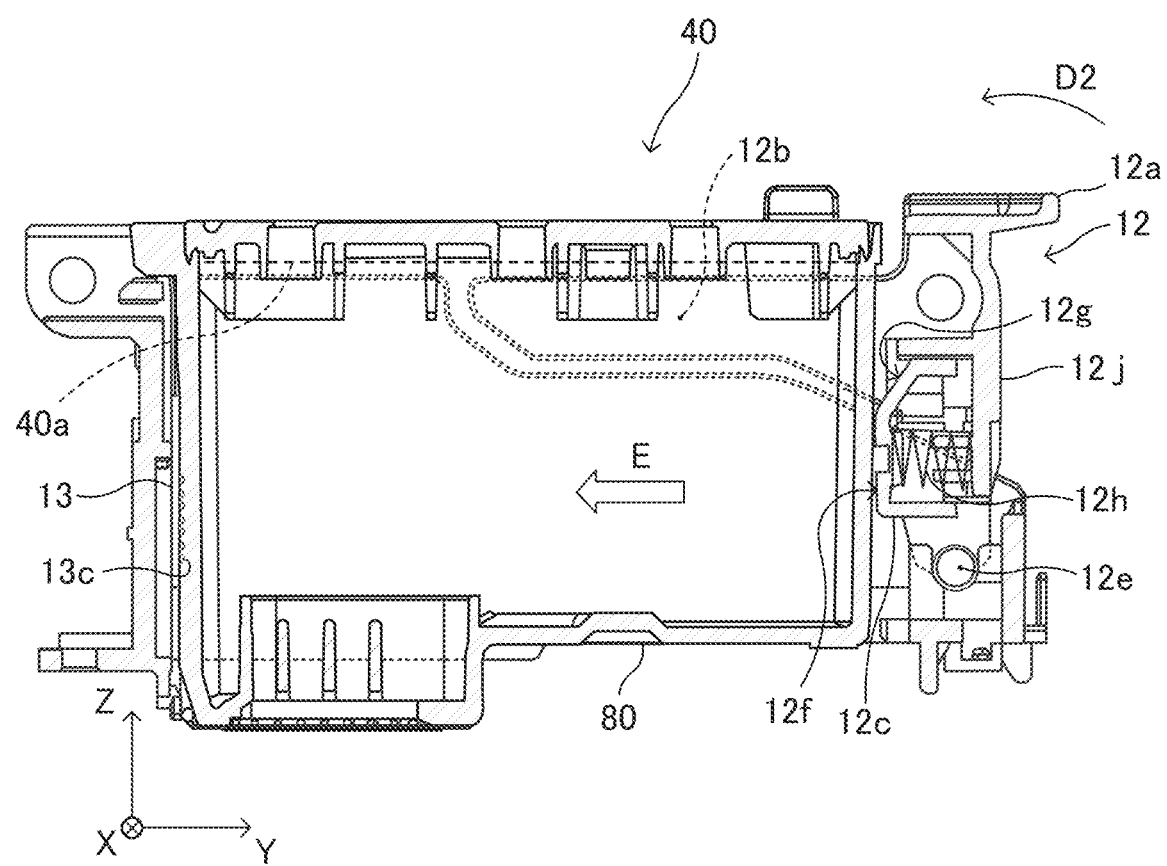
FIG. 17 is a cross-sectional view illustrating a state where attachment of the ink cartridge is completed.

FIG. 17 is a cross-sectional view of a state where attachment of the ink cartridge 40 is completed (the ink cartridge 40 is located at the set position).

As the ink cartridge 40 is inserted from the state illustrated in FIG. 16, the pressing force of the pressure spring 12h becomes greater. At this time, if the pressurizing face 12f is inclined with respect to the pressed face 40d of the ink cartridge 40 and is in a state of one side abutment, there arises force that causes the pressurizing face 12f to become in parallel contact with the pressed face 40d of the ink cartridge 40. If this force acts, even if the push-up lever 12b is not pushed downward by the flange portion 40a, the pressing portion holder 12j rotates in the direction indicated by arrow D2 in FIGS. 16 and 17, and the pressing portion holder 12j reaches a position illustrated in FIG. 17. Therefore, as illustrated in FIG. 17, even if the flange portion 40a is not in contact with the push-up lever 12b, the pressing portion holder 12j can rotate to the position illustrated in FIG. 17.

In the present embodiment, during a period between the state illustrated in FIG. 16 (state where the ink cartridge 40 is located at the attaching and detaching position) and the state illustrated in FIG. 17 (state where the ink cartridge 40 is located at the set position), while the ink cartridge 40 is moving, the ink cartridge 40 receives the pressing force by the pressure spring 12h. By this, while the ink cartridge 40 is moving, the pressing portion 12c presses the pressed face 40d of the ink cartridge 40, and the guided face 40c of the ink cartridge 40 is thereby pressed against a guiding face 82 which is an inner wall face on a printer rear side of a cartridge holder 80 as a replacement part holder. Therefore, the position (posture) of the ink cartridge 40 is kept stable in a state where the guided face 40c abuts on the guiding face 82. By this, it is possible to prevent a situation where the position of the ink cartridge 40 collapses while the ink cartridge 40 is moving, and appropriate movement of the ink cartridge 40 is inhibited. As a result, it is possible to prevent a situation where the position of the ink cartridge 40 collapses while the ink cartridge 40 is moving, the ink cartridge 40 collides with the printer body 1, and the ink cartridge 40 and the printer body 1 are damaged or defaced.

A configuration and operation when the ink cartridge 40 is taken out from the printer body 1 will be described next.

In the set state illustrated in FIGS. 8 and 17, the operation portion 12a of the cartridge attaching and detaching mechanism 12 is dragged in the direction indicated by arrow D1 in FIG. 9 (direction opposite to the direction indicated with the arrow D2 in FIG. 17), so that the cartridge attaching and detaching mechanism 12 is open. The cartridge attaching and detaching mechanism 12 rotates around the rotation shaft 12e in conjunction with this movement of the operation portion 12a, which causes the push-up lever 12b to push up the flange portion 40a of the ink cartridge 40. By this, the ink cartridge 40 is lifted up and put into a lifted up state illustrated in FIG. 9 (state illustrated in FIG. 16).

At this time, in the present embodiment, a portion where the push-up lever 12b pushes up the flange portion 40a of the ink cartridge 40 in the pressing direction of the pressing portion 12c is located at or near a position of the center of gravity of the ink cartridge 40. By this, while the ink cartridge 40 is moving from the set state illustrated in FIGS. 8 and 17 to the lifted up state illustrated in FIGS. 9 and 16, rotational moment which causes the ink cartridge 40 to rotate is less likely to occur, and the position of the ink cartridge 40 is less likely to change and is stabilized.

As the ink cartridge 40 is thus lifted up, the user can grasp the ink cartridge 40 and pull out the ink cartridge 40 in the direction in which the ink cartridge 40 is lifted up (the direction in which the ink cartridge moves from the set position to the attaching and detaching position, upward in the vertical direction), thereby taking out the ink cartridge 40 from the printer body 1. At this time, because the ink cartridge 40 is pulled out in a direction which is the same as the direction in which the ink cartridge 40 is lifted up, the user can intuitively recognize a direction in which the ink cartridge 40 should be pulled out when the user removes the ink cartridge 40, and does not dither over a direction in which the ink cartridge 40 should be pulled out.

When the ink cartridge 40 is pulled out, the user can easily pull out the ink cartridge 40 by hooking his/her fingers at the flange portion 40a of the ink cartridge 40. In some cases, a side wall of the cartridge holder 80 hinders the user from grasping the ink cartridge 40. Accordingly, in the present embodiment, as illustrated in FIG. 9, a cutout portion 83 is provided at an upper end of the side wall of the cartridge holder 80. Specifically, the cutout portion 83 is disposed at an upper end of a side wall 830. The side wall 830 faces in the X direction in FIG. 9, which is orthogonal to the pressing direction (opposite to the Y direction in FIG. 9) by the pressing portion 12c and along the moving direction (vertical direction in FIG. 16) of the ink cartridge 40. By this, by utilizing the cutout portion 83, the user can grasp the ink cartridge 40 by hooking his/her fingers at the flange portion 40a of the lifted up ink cartridge 40 without the side wall portion of the cartridge holder 80 being an encumbrance.

Further, as illustrated in FIG. 9, the cutout portion 83 in the present embodiment is formed on an opposite side of a side on which the operation portion 12a which is a member integrated with the push-up lever 12b is disposed, from a portion where the push-up lever 12b pushes up the flange portion 40a of the ink cartridge 40. By this, because the push-up lever 12b which abuts on the flange portion 40a is not located at a portion reaching the cutout portion 83, the push-up lever 12b does not become an encumbrance when the fingers are hooked at the flange portion 40a of the ink cartridge 40 by utilizing the cutout portion 83.

In the present embodiment, while the ink cartridge 40 is moving also during a period between the set state illustrated in FIGS. 8 and 17 and the lifted up state illustrated in FIGS. 9 and 16, the ink cartridge 40 receives the pressing force of the pressure spring 12h. By this, while the ink cartridge 40 is moving, the pressing portion 12c presses the pressed face 40d of the ink cartridge 40, and a guided face 40c of the ink cartridge 40 is thereby pressed against a guiding face 82 which is an inner wall face on a printer rear side of a cartridge holder 80 as a replacement part holder. Therefore, a position of the ink cartridge 40 is maintained and stabilized in a state where the guided face 40c abuts on the guiding face 82. By this, it is possible to prevent a situation where the position of the ink cartridge 40 collapses while the ink cartridge 40 is moving, and appropriate movement of the ink cartridge 40 is inhibited. As a result, it is possible to prevent a situation where the position of the ink cartridge 40 collapses while the ink cartridge 40 is moving, the ink cartridge 40 collides with the printer body 1, and the ink cartridge 40 and the printer body 1 are damaged or defaced.

Note that, in the present embodiment, in the lifted up state illustrated in FIGS. 9 and 16, a claw portion of the pressing portion 12c is hooked at the pressing portion holder 12j, so that the pressing force of the pressure spring 12h does not act on the ink cartridge 40. However, it is also possible to employ a configuration where, in the lifted up state illustrated in FIGS. 9 and 16, the claw portion of the pressing portion 12c is not hooked at the pressing portion holder 12j, so that the pressing force of the pressure spring 12h acts on the ink cartridge 40.

In this case, even in a state where the ink cartridge 40 is lifted up, the ink cartridge 40 is pressed against the guiding face 82 by the pressing portion 12c, and the ink cartridge 40 is less likely to be dropped from the printer body 1. In the present embodiment, an apparatus body to which the ink cartridge 40 which is a replacement part is to be attached is a handy mobile inkjet printer (HMP), which is easily tilted or turned by the user. Therefore, in the lifted up state illustrated in FIGS. 9 and 16, there is a possibility that the ink cartridge 40 is dropped from the printer body 1 by the printer body 1 being tilted or turned. To suppress this dropping, it is also possible to employ a configuration where the pressing force of the pressure spring 12h acts on the ink cartridge 40 in the lifted up state illustrated in FIGS. 9 and 16.

However, the pressing force acting on the ink cartridge 40 by the pressing portion 12c in the lifted up state illustrated in FIGS. 9 and 16 is preferably weaker than the pressing force acting on the ink cartridge 40 by the pressing portion 12c in the set state illustrated in FIGS. 8 and 17. With this configuration, while reducing the force required for the user to pull out the ink cartridge 40 in the lift-up state, the ink cartridge 40 can be firmly pressed to and held by the guiding face side in the set state of the ink cartridge 40 set at the printer body 1.

Further, as illustrated in FIG. 9, in the present embodiment, in the direction in which the flange portion 40a of the ink cartridge 40 projects, the thickness of the push-up lever 12b is made equal to or smaller than the projection amount of the flange portion 40a. This thickness is advantageous to make the printer body 1 compact in the projection direction of the flange portion 40a, that is, a printer horizontal direction.

Further, the push-up lever 12b of the present embodiment is configured as follows. As illustrated in FIG. 13, when the operation portion 12a is drawn to the printer front face side by the force acting on the force point portion 51 (position where the user performs operation) of the operation portion 12a, in conjunction with the movement of the operation portion 12a, the push-up lever 12b rotates around the rotation shaft 12e which is a supporting point S2 supported by the printer body 1 so that a point of application S3 pressing the flange portion 40a of the ink cartridge 40 shifts from the set position to the attaching and detaching position. In the present embodiment, a distance L2 between the support point S2 and the point of application S3 is set equal to or longer than a distance L1 between the support point S2 and the force point portion S1. This enables sufficient lifting up even with a small operation movement amount of the operation portion 12a.

MODIFIED EXAMPLE

A modified example of a moving mechanism and a pressing device in the present embodiment will be described next.

In the above-described example, the pressing portion 12c which constitutes the pressing device is disposed on a side which is the same as the printer front face side on which the operation portion (e.g., the operation portion 12a) of the cartridge attaching and detaching mechanism 12 is disposed, and the guiding face 82 against which the ink cartridge 40 is pressed by pressurization of the pressing portion 12c is disposed on a printer rear side opposite to the printer front face side on which the operation portion is disposed. While such arrangement is normally advantageous in view of space saving in a longitudinal direction of the device, there is a case where it is required to avoid such arrangement in terms of design layout. In the present modified example, the pressing portion 12c is made independent of the cartridge attaching and detaching mechanism 12, and is disposed on a side opposite to a side on which the operation portion (e.g., the operation portion 12a) of the cartridge attaching and detaching mechanism 12 is disposed.

Figure 18:
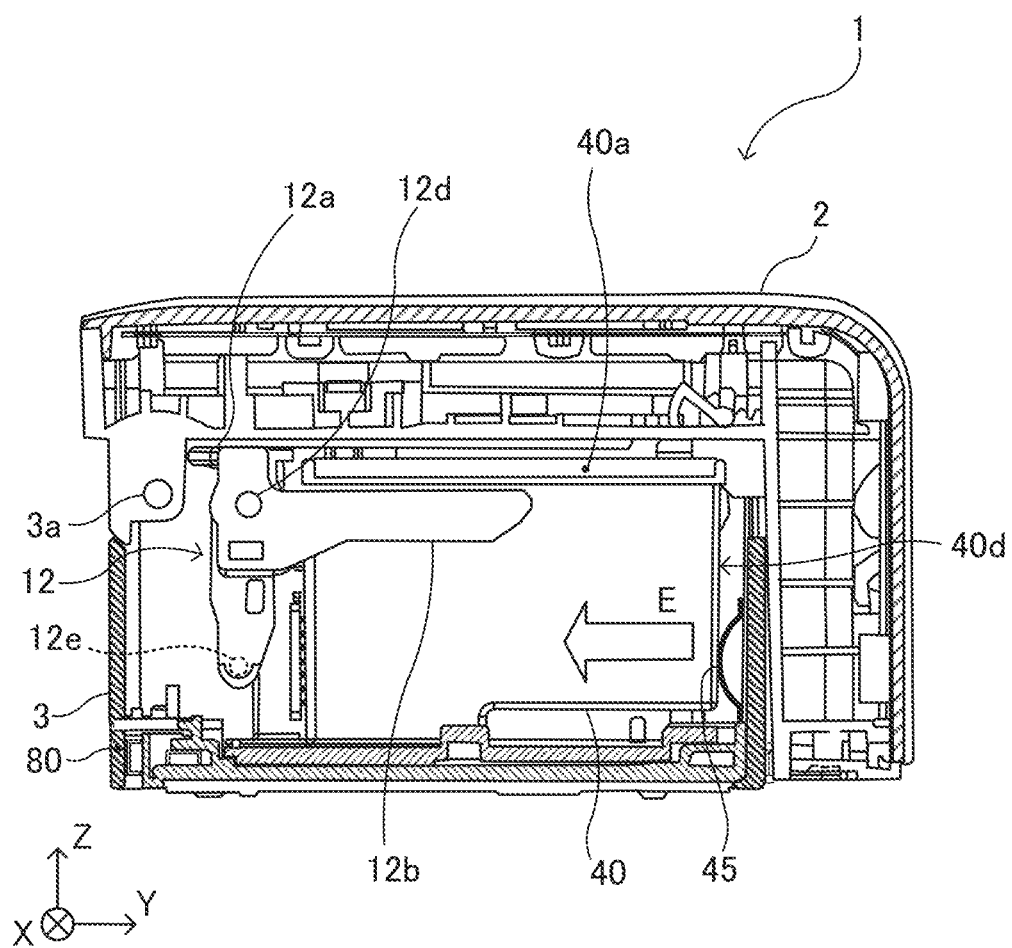
FIG. 18 is a cross-sectional view of the printer body in a state where the upper unit is closed, viewed from a left face side, in a modified example.
Figure 19:
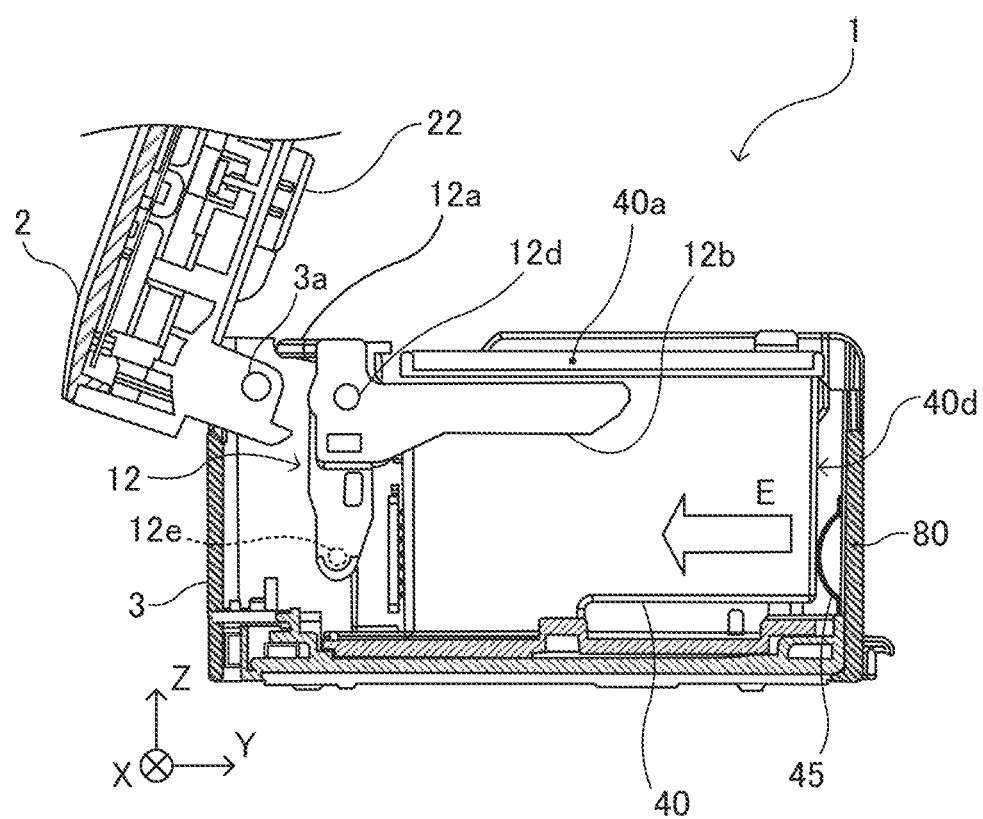
FIG. 19 is a cross-sectional view illustrating a state where the upper unit is open from the state illustrated in FIG. 18.
Figure 20:
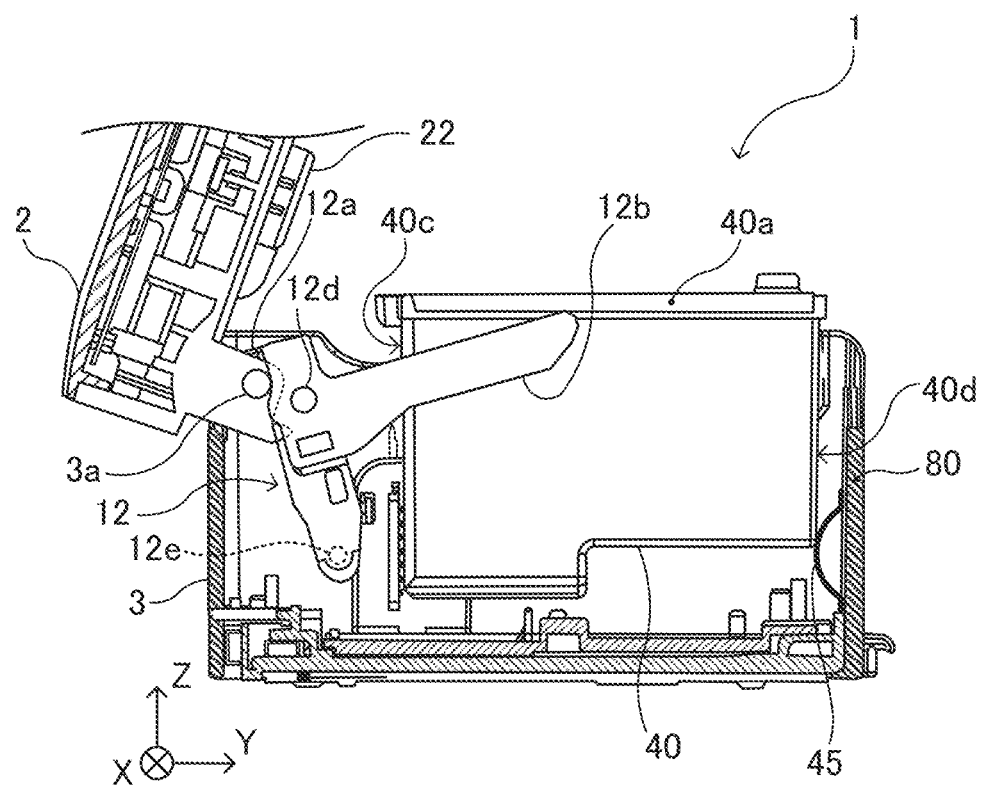
FIG. 20 is a cross-sectional view illustrating a state where the ink cartridge is lifted up from the state illustrated in FIG. 19.

FIGS. 18, 19, and 20 are cross-sectional views of the printer body 1 according to the present modified example, viewed from a left face side. FIG. 18 is a cross-sectional view illustrating a state where the upper unit 2 is closed, FIG. 19 is a cross-sectional view illustrating a state where the upper unit 2 is open from the state illustrated in FIG. 18, and FIG. 20 is a cross-sectional view illustrating a state where the ink cartridge 40 is lifted up from the state illustrated in FIG. 19.

In the present modified example, the pressing device is independent of the cartridge attaching and detaching mechanism 12, and a curved flat spring 45 attached to the inner wall face on the printer front face side of the cartridge holder 80 serves as the pressing device. This curved flat spring is an elastic plate which is curved in a vertical direction (moving direction of the ink cartridge 40) and disposed. The curved flat spring 45 is disposed at a position where, when the ink cartridge 40 is in a lifted up state, as illustrated in FIG. 20, a lower end of the pressed face 40*d* of the ink cartridge 40 slightly reaches and contacts the curved flat spring 45 and presses the pressed face 40*d* with relatively weak force. Therefore, even in a state where the ink cartridge 40 is lifted up, the ink cartridge 40 is pressed against the guiding face 82 by the curved flat spring 45, and the ink cartridge 40 is less likely to drop from the printer body 1. Further, because the ink cartridge 40 is pressed with relatively weak force, the user can extract ink cartridge 40 in the lifted up state with less force.

Meanwhile, while the ink cartridge 40 is moved from the lifted up state illustrated in FIG. 20 to the set state illustrated in FIG. 19, the lower end of the pressed face 40*d* of the ink cartridge 40 gradually moves over the curved flat spring 45, the pressing force acting on the pressed face 40*d* of the ink cartridge 40 by the curved flat spring 45 increases in accordance with this movement, and force of pressing the guided face 40*c* of the ink cartridge 40 against the guiding face 82 also gradually increases. Then, if the lower end of the pressed face 40*d* of the ink cartridge 40 moves over a top of the curved flat spring 45, maximum pressing force acts, and force of pressing the guided face 40*c* of the ink cartridge 40 against the guiding face 82 becomes maximum. In the set state illustrated in FIG. 19, the guided face 40*c* of the ink cartridge 40 is pressed against the guiding face 82 with maximum force.

In the present modified example, the operation portion 12*a* of the cartridge attaching and detaching mechanism 12 is disposed on a side of the upper unit rotation shaft 3*a*. By this, even if an opening angle of the upper unit 2 is the same angle, compared to a configuration in the above-described embodiment where the cartridge attaching and detaching mechanism 12 is provided on an opposite side of the upper unit rotation shaft 3*a*, an access path to the operation portion 12*a* of the cartridge attaching and detaching mechanism 12 becomes narrower. By this, it is difficult to access the operation portion 12*a* of the cartridge attaching and detaching mechanism 12 in a state where the upper unit 2 is halfway open, so that it is possible to suppress erroneous operation with respect to the operation portion 12*a*.

Note that, while, in the above-described embodiment, an example where the present invention is applied to a mobile handheld printer 10 which is a mobile image forming apparatus has been described, the present invention can be applied to any image forming apparatus to and from which a replacement part can be attached and detached, and can be also applied to a stationary type image forming apparatus. Further, an image forming scheme is not limited to an inkjet scheme, and may be an electrophotography scheme. Still further, while, in the present embodiment, an example has been described where the replacement part is the ink cartridge 40 (liquid cartridge) which stores ink (liquid) discharged on a recording material, other replacement parts may be used.

The above-described image forming apparatus is an example, and the present invention has effects peculiar for each aspect described below.

First Aspect

A first aspect concerns an image forming apparatus (for example, the handheld printer 10) that includes a moving mechanism (for example, the cartridge attaching and detaching mechanism 12) to move a replacement part (for example, the ink cartridge 40) between a set position (illustrated in FIG. 8) in an apparatus body (for example, the printer body 1) and an attaching and detaching position (illustrated in FIG. 9) at which the replacement part is attached to and detached from the apparatus body. In this structure, the replacement part includes a guided face (for example, the guided face 40*c*) extending along the direction in which the replacement part moves between the set position, and the image forming apparatus includes a guiding face (for example, the guiding face 82) to guide the guided face of the replacement part. The image forming apparatus further includes a pressing device (for example, the pressing portion 12*c* and the curved flat spring 45 to press the guided face of the replacement part against the guiding face while the replacement part moves between the set position and the attaching and detaching position.

In the present aspect, while the replacement part moves between the set position and the attaching and detaching position, the guided face located on the side of the movement direction of the replacement part is pressed against the guiding face. Accordingly, the position (posture) of the replacement part is kept stable during movement of the replacement part. By this, it is possible to prevent a situation where the position of the replacement part collapses while the replacement part is moving, and appropriate movement is inhibited.

Second Aspect

A second aspect is, in the image forming apparatus according to the first aspect, the pressing device is configured to press the replacement part against the guiding face also when the replacement part is located at the attaching and detaching position.

According to this aspect, the replacement part located at the attaching and detaching position is less likely to drop from the apparatus body.

Third Aspect

A third aspect is, in the image forming apparatus according to the second aspect, the pressing device is configured to press the replacement part located at the attaching and detaching position against the guiding face with a reduced pressing force from the pressing force with which the pressing device presses the replacement part located at the set position.

This aspect can secure the pressing force to hold the replacement part located at the set position while preventing the replacement part located at the attaching and detaching position from dropping from the printer body.

Fourth Aspect

A fourth aspect concerns the image forming apparatus according to one of the first to the third aspects. Further, the moving mechanism includes an operation portion (for example, the operation portion 12*a*) disposed on a first side along the movement direction of the replacement part, and a moving member (for example, the push-up lever 12*b*) to move the replacement part between the set position and the attaching and detaching position in conjunction with movement of the operation portion. Further, the guiding face is disposed on a second side along the movement direction of the replacement part and opposite to the first side on which the operation portion is disposed, and the pressing device is disposed on the first side on which the operation portion is disposed.

According to this aspect, it is possible to collectively dispose the moving mechanism and the pressing device on the same side on a side along the movement direction of the replacement part, which is advantageous in space saving.

Fifth Aspect

A fifth aspect is the image forming apparatus according to the fourth aspect where the moving member (for example, the push-up lever 12b) is located on a third side of the apparatus body. The third side is along the movement direction of the replacement part in a direction orthogonal to the pressing direction of the pressing device. The moving member moves the replacement part from the set position to the attaching and detaching position by pressing a projecting portion (for example, the flange portion 40a) provided on a face of the replacement part, in conjunction with an action of the operation portion.

According to this aspect, it is possible to easily realize a moving mechanism of moving the replacement part from the set position to the attaching and detaching position.

Sixth Aspect

A six aspect is the image forming apparatus according to the fifth aspect where a thickness of the moving member in a projecting direction of the projecting portion is equal to or less than a projection amount of the projecting portion.

According to this aspect, it is advantageous in that a size of the device in the projecting direction of the projecting portion is made small.

Seventh Aspect

A seventh aspect is the image forming apparatus according to the fifth or the sixth aspect where the moving member rotates around a support point (e.g., the support point S2) supported by the apparatus body in conjunction with operation movement of the operation portion by force acting on a force point portion Si of the operation portion, so as to move in a direction in which a point of application (e.g., the point of application S3) of the replacement part (pressing the projecting portion) moves from the set position to the attaching and detaching position. Further, a distance (e.g., the distance L2) between the support point and the point of application is equal to or greater than a distance (e.g., the distance L1) between the support point and the force point portion.

According to this aspect, it is possible to easily secure a sufficient movement amount of the replacement part even with a less operation movement amount with respect to the operation portion.

Eighth Aspect

An eighth aspect is an image forming apparatus in one of the fifth to the seventh aspects where a pressed position where the moving member presses the projecting portion of the replacement part in a pressing direction of the pressing device is located at or near a position of the center of gravity of the replacement part.

According to this aspect, rotational moment which rotates the replacement part while the replacement part is moving is less likely to occur, so that a position of the replacement part is less likely to change and is stabilized.

Ninth Aspect

A ninth aspect is the image forming apparatus according to one of the fifth to the eighth aspects where the apparatus body includes a replacement part holder (for example, the cartridge holder 80) which holds the replacement part. Further, the replacement part holder includes a cutout portion (e.g., the cutout portion 83) as an access to the replacement part located at the attaching and detaching position so that the user can grasp the replacement part. The cutout portion is provided on a side wall which faces the side along the movement direction of the replacement part and along the pressing direction of the pressing device. The cutout portion is disposed farther from the first side on which the operation portion is disposed than a portion where the moving member presses the projecting portion of the replacement part.

According to this aspect, because the moving member which presses the projecting portion of the replacement part does not reach the cutout portion, the moving member does not become an encumbrance when the fingers are hooked at the projecting portion of the replacement part and grasped by utilizing the cutout portion.

Tenth Aspect

A tenth aspect is the image forming apparatus according to one of the first to the ninth aspects where the replacement part is a liquid cartridge (for example, the ink cartridge 40) which stores a liquid (for example, ink) discharged on a recording material.

According to this aspect, a position of the liquid cartridge while the liquid cartridge moves between the set position and the attaching and detaching position becomes stable, and it is possible to prevent a situation where the position of the liquid cartridge collapses while the liquid cartridge is moving, and appropriate movement is inhibited.

Eleventh Aspect

An eleventh aspect is the image forming apparatus according to one of the first to the tenth aspects where an attaching and detaching direction of the replacement part located at the attaching and detaching position substantially matches the movement direction of the replacement part which moves between the set position and the attaching and detaching position.

When the user removes the replacement part, the user can intuitively recognize a direction in which the replacement part should be pulled out, so that the user does not dither over a direction in which the replacement part should be pulled out.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An image forming apparatuses comprising:
   an apparatus body configured to house a replacement part, the apparatus body including a guiding face configured to guide a guided face of the replacement part, the guided face on a side along a movement direction in which the replacement part moves between a set position in the apparatus body and an attaching and detaching position at which the replacement part is attached to and detached from the apparatus body;
   a moving device configured to move the replacement part between the set position and the attaching and detaching position; and
   a pressing device configured to press the guided face of the replacement part against the guiding face of the apparatus body while the replacement part moves between the set position and the attaching and detaching position.

2. The image forming apparatus according to claim 1, wherein the pressing device is configured to press, against the guiding face, the replacement part being at the attaching and detaching position.

3. The image forming apparatus according to claim 2,
wherein the pressing device is configured to press, against the guiding face, the replacement part being at the attaching and detaching position with a reduced pressing force from a pressing force with which the pressing device presses the replacement part being at the set position.

4. The image forming apparatus according to claim 1,
wherein the pressing device includes:
  an operation portion disposed on a first side of the apparatus body along the movement direction of the replacement part; and
  a moving member configured to move the replacement part between the set position and the attaching and detaching position,
wherein the guiding face is disposed on a second side of the apparatus body opposite the first side of the apparatus body, and
wherein the pressing device is disposed on the first side of the apparatus body.

5. The image forming apparatus according to claim 4,
wherein the moving member is disposed on a third side of the apparatus body, the third side being along the movement direction of the replacement part, the third side extending in a pressing direction in which the pressing device presses the guided face of the replacement part against the guiding face, and
wherein the moving member is configured to push a projecting portion projecting from a face of the replacement part on the third side, to move the replacement part from the set position to the attaching and detaching position.

6. The image forming apparatus according to claim 5,
wherein a thickness of the moving member in a projecting direction of the projecting portion is equal to or smaller than a projection amount of the projecting portion.

7. The image forming apparatus according to claim 5,
wherein the operation portion is configured to act by force acting on a force point of the operation portion,
wherein the moving member is configured to:
  rotate, around a support point of the moving device supported by the apparatus body, in conjunction with an action of the operation portion; and
  move to shift a point of application of the moving member from the set position toward the attaching and detaching position, the point of application at which the moving member pushes the projecting portion of the replacement part, and
wherein a distance between the supporting point and the point of application is equal to or greater than a distance between the supporting point and the force point.

8. The image forming apparatus according to claim 5,
wherein a pressed position of the projecting portion pressed by the moving member in the pressing direction of the pressing device is located at or near a center of gravity of the replacement part.

9. The image forming apparatus according to claim 5,
wherein the apparatus body further includes a replacement part holder configured to hold the replacement part,
wherein the replacement part holder includes a cutout portion disposed in a side wall extending along the movement direction of the replacement part and along the pressing direction of the pressing device, the cutout portion being as access to the replacement part being at the attaching and detaching position, and
wherein the cutout portion is disposed farther from the first side on which the operation portion is disposed than a point of application of the moving member pressing the projecting portion of the replacement part.

10. The image forming apparatus according to claim 1, further comprising the replacement part that is a liquid cartridge configured to store a liquid to be discharged onto a recording medium.

11. The image forming apparatus according to claim 1,
wherein a direction in which the replacement part being at the attaching and detaching position is attached to or detached from the apparatus body matches the movement direction of the replacement part between the set position and the attaching and detaching position.

* * * * *